United States Patent
Wold et al.

(10) Patent No.: US 11,294,954 B2
(45) Date of Patent: Apr. 5, 2022

(54) MUSIC COVER IDENTIFICATION FOR SEARCH, COMPLIANCE, AND LICENSING

(71) Applicant: Audible Magic Corporation, Los Gatos, CA (US)

(72) Inventors: Erling Wold, San Francisco, CA (US); Jay Friedman, Monte Sereno, CA (US); Richard Boulderstone, Peterborough (GB)

(73) Assignee: Audible Magic Corporation, Los Gatos, CA (US)

( * ) Notice: Subject to any disclaimer, the term of this patent is extended or adjusted under 35 U.S.C. 154(b) by 321 days.

(21) Appl. No.: 15/862,433

(22) Filed: Jan. 4, 2018

(65) Prior Publication Data
US 2019/0205467 A1   Jul. 4, 2019

(51) Int. Cl.
*G06F 16/683*  (2019.01)
*G06F 16/68*  (2019.01)
(Continued)

(52) U.S. Cl.
CPC .......... *G06F 16/683* (2019.01); *G06F 16/634* (2019.01); *G06F 16/686* (2019.01);
(Continued)

(58) Field of Classification Search
CPC .... G06F 16/634; G06F 16/683; G06F 16/686; G06F 21/10; G06F 2221/074; G06Q 50/184
See application file for complete search history.

(56) References Cited

U.S. PATENT DOCUMENTS

| | | |
|---|---|---|
| 5,918,223 A | 6/1999 | Blum et al. |
| 6,834,308 B1 | 12/2004 | Ikezoye et al. |

(Continued)

FOREIGN PATENT DOCUMENTS

| | | | |
|---|---|---|---|
| CN | 110717062 A | 1/2020 | |
| EP | 3508986 A1 | 7/2019 | |
| WO | WO-03088534 A1 * | 10/2003 | ........... G06F 16/683 |

OTHER PUBLICATIONS

Chen, Ching-Wei, Randall Cook, Markus Cremer, and Peter DiMaria. "Content identification in consumer applications." in 2009 IEEE International Conference on Multimedia and Expo, pp. 1536-1539. IEEE, 2009. (Year: 2009).*

(Continued)

*Primary Examiner* — Jesse P Frumkin
(74) *Attorney, Agent, or Firm* — Lowenstein Sandler LLP

(57) ABSTRACT

An unidentified media content item may be received by a processing device. A set of features of the unidentified media content item may be determined. Metadata associated with the unidentified media content item may be determined. A first similarity between the metadata associated with the unidentified media content item and additional metadata associated with a known media content item from a media content repository may be determined. A second similarity between the set of features of the unidentified media content item and an additional set of features associated with the known media content item may be determined. The unidentified media content item may be identified as a cover of the known media content item based on the first similarity and the second similarity by the processing device.

20 Claims, 14 Drawing Sheets

(51) Int. Cl.
*G06F 16/632* (2019.01)
*G06Q 50/18* (2012.01)
*G06F 21/10* (2013.01)

(52) U.S. Cl.
CPC ........... *G06Q 50/184* (2013.01); *G06F 21/10* (2013.01); *G06F 2221/074* (2013.01)

(56) References Cited

U.S. PATENT DOCUMENTS

| | | | |
|---|---|---|---|
| 6,968,337 | B2 | 11/2005 | Wold |
| 7,043,473 | B1* | 5/2006 | Rassool ................. H04N 5/913 |
| 7,363,278 | B2 | 4/2008 | Schmelzer et al. |
| 7,562,012 | B1 | 7/2009 | Wold et al. |
| 8,006,314 | B2 | 8/2011 | Wold |
| 8,130,746 | B2 | 3/2012 | Schrempp |
| 8,199,651 | B1 | 6/2012 | Schrempp et al. |
| 8,332,326 | B2 | 12/2012 | Schrempp et al. |
| 8,965,766 | B1 | 2/2015 | Weinstein et al. |
| 8,972,481 | B2 | 3/2015 | Schrempp et al. |
| 9,081,778 | B2 | 7/2015 | Garside et al. |
| 2003/0023421 | A1* | 1/2003 | Finn ...................... G10H 1/0008 704/1 |
| 2004/0131255 | A1* | 7/2004 | Ben-Yaacov ........ G11B 27/034 382/190 |
| 2009/0037975 | A1* | 2/2009 | Ishikawa ............... G06F 21/105 726/1 |
| 2009/0228510 | A1* | 9/2009 | Slaney .................... G06F 16/58 |
| 2009/0281995 | A1* | 11/2009 | Mousavi ............... G06F 16/951 |
| 2012/0246584 | A1* | 9/2012 | Beroukhim ............ G06Q 30/02 715/763 |
| 2013/0091167 | A1* | 4/2013 | Bertin-Mahieux ... G06F 16/683 707/769 |
| 2013/0226957 | A1* | 8/2013 | Ellis ...................... G06F 16/634 707/769 |
| 2014/0040980 | A1* | 2/2014 | King ..................... G06F 16/683 726/1 |
| 2017/0075992 | A1 | 3/2017 | Oztaskent et al. |
| 2017/0185675 | A1* | 6/2017 | Arngren .................. G06F 21/10 |
| 2018/0189390 | A1* | 7/2018 | Cremer ................. G06F 16/683 |
| 2018/0211650 | A1 | 7/2018 | Knudson et al. |
| 2021/0357451 | A1* | 11/2021 | Wold ....................... G10L 15/32 |

OTHER PUBLICATIONS

Chen et al., "Fusing similarity functions for cover song identification," Multimedia Tools and Applications, Feb. 9, 2017, 24 pages.
Ellis, Daniel P.W., "Beat tracking by dynamic programming," Journal of New Music Research, Jul. 16, 2007, 21 pages.
Ellis et al., "Identifying 'Cover Songs' with Chroma Features and Dynamic Programming Beat Tracking," IEEE International Conference on Acoustics, Speech and Signal Processing, Apr. 20, 2007, 16 pages.
Ravuri et al., "Cover Song Detection: From High Scores to General Classification," IEEE International Conference on Acoustics, Speech and Signal Processing, Apr. 2010, 5 pages.
Serra et al., "Audio cover song identification and similarity: background, approaches, evaluation, and beyond," Advances in Music Information Retrieval (2010) 274, pp. 307-332.
Serra et al., "Chroma Binary Similarity and Local Alignment Applied to Cover Song Identification," Advances in Music Information Retrieval (2010) 274, pp. 307-332.
Serra et al., "Transposing Chroma Representations to a Common Key," IEEE CS Conference on the Use of Symbols to Represent Music and Multimedia Objects (2008), 4 pages.
Tralie et al., "Cover Song Identification with Timbral Shape Sequences," 16th International Society for Music Information Retrieval, Jul. 21, 2015, pp. 38-44.
Tralie, Christopher J., "Early MFCC and HPCP Fusion for Robust Cover Song Identification," 18th International Society for Music Information Retrieval (2017), 11 pages.
Wang et al., "Similarity network fusion for aggregating data types on a genomic scale," Nature America, Inc., vol. 11, No. 3, Mar. 2014, pp. 333-337.
Casey, M. A. et al., "Content-Based Music Information Retrieval: Current Directions and Future Challenges", Proceedings of the IEEE, vol. 96, No. 4, Apr. 1, 2008, pp. 668-696, New York, US.
Nanopoulos A. et al., "Music Search Engines: Specificaitons and Challenges", Information Processing & Management, vol. 45, No. 3, May 1, 2009, Elsevier, Barking, GB, pp. 392-396.
Ning Chen et al., "Two-Layer Similarity Fusion Model for Cover Song Identification", Eurasip Journal on Audio, Speech, and Music Processing, vol. 2017, No. 1, May 22, 2017, Biomed Central Ltd., London, UK, pp. 1-15.
Osmalskyj, J. et al., "Efficient Database Pruning for Large-Scale Cover Song Recognition", International Workshop on Acoustic Signal Enhancement 2012, Institute of Electrical and Electronics Engineers, May 26, 2013, Piscataway, NJ, pp. 714-718.
Rafii, "Live Music Recognition at Gracenote", Feb. 23, 2017, retrieved from the Internet on Nov. 16, 2020, 8 pages, https://www.gracenote.com/live-music-recognition-gracenote/.
Rafii, "Live Music Recogniton at Gracenote", Feb. 23, 2017, retrieved from the internet on Nov. 16, 2020, 8 pages URL:https://www.gracenote.com/live-music-recognition-gracenote/.
EP Communication for EP Patent Application No. 19 150 049.5, dated Nov. 20, 2020, 9 pages.
PCT Notification of Transmittal of The International Search Report and The Written Opinion Of The International Searching Authority for PCT Application No. PCT/US2021/032589 dated Sep. 22, 2021, 16 pages.

* cited by examiner

MUSIC COVER IDENTIFICATION FOR SEARCH, COMPLIANCE, AND LICENSING

TECHNICAL FIELD

This disclosure relates to the field of media content identification, and in particular to identifying media content items as covers of original works.

BACKGROUND

A large and growing population of users enjoy entertainment through the consumption of media content items, including electronic media, such as digital audio and video, images, documents, newspapers, podcasts, etc. Media content sharing platforms provide media content items to consumers through a variety of means. Users of the media content sharing platform may upload media content items (e.g., user generated content) for the enjoyment of the other users. Some users upload cover versions of a known work of a content owner to the media content sharing platform without prior authorization. A cover version or cover is a new performance or recording of a previously performed or recorded musical composition. A content owner seeking to identify unauthorized uploads of cover versions of their protected, known works will generally have to review media content items to determine covers of their works. The process of evaluating each and every media content item uploaded by users or evaluating the entire available content of a media content supplier (e.g., a media content sharing platform) to identify potential cover versions of known works is time consuming and requires a substantial investment into computing/processing power and communication bandwidth.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
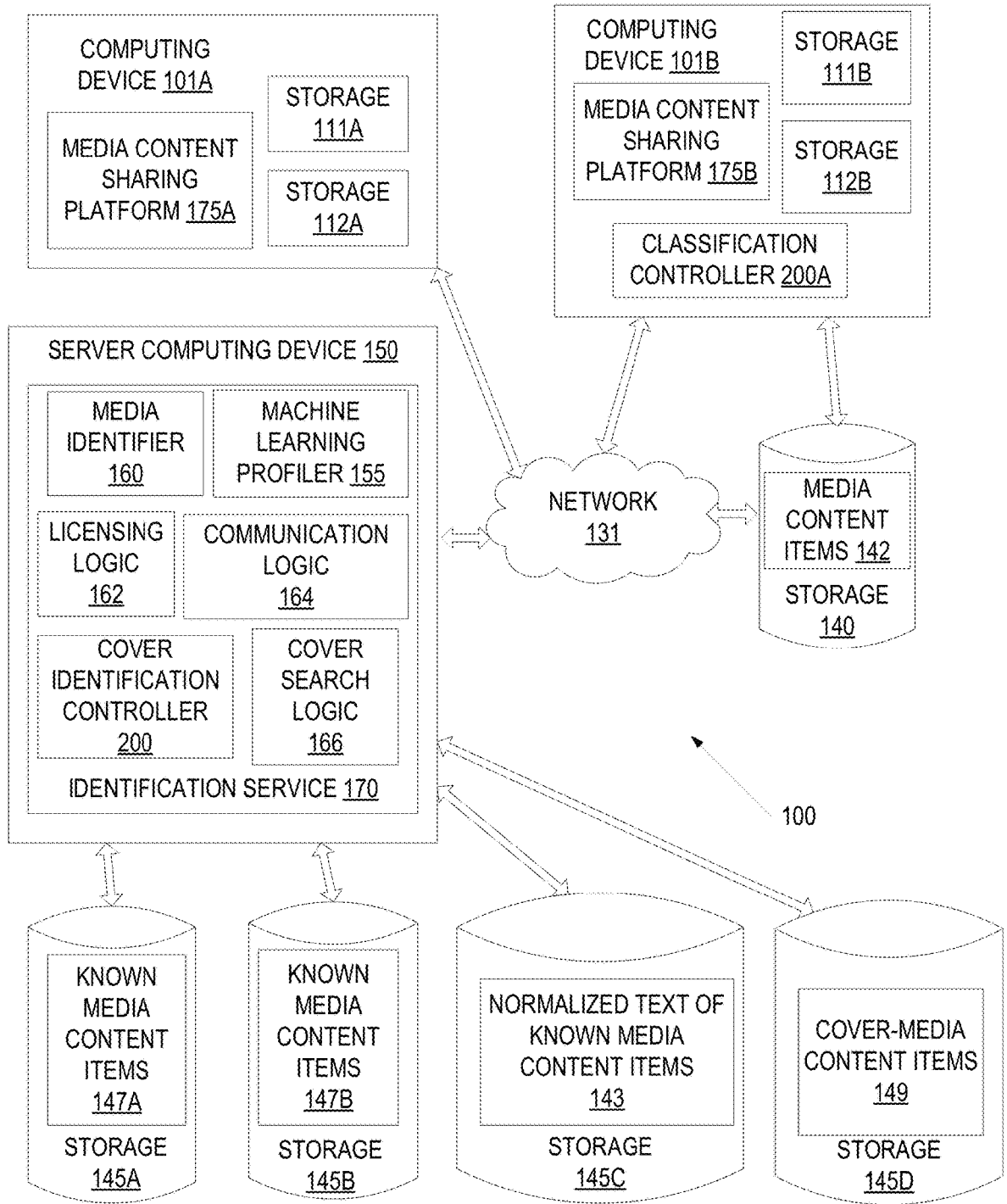
FIG. 1 is a block diagram illustrating a network environment in which embodiments of the present invention may operate.

Embodiments are described for identifying media content items. A media content item may be audio (e.g., a song or album), a video, or other work that contains an audio portion. Media content items may be files (e.g., audio files having formats such as WAV, AIFF, AU, FLAC, ALAC, MPEG-4, MP3, Opus, Vorbis, AAC, ATRAC, WMA, and so on, or video files having formats such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). Media content items may also be live streams of video and/or audio media. A media content item that is a cover (e.g., a cover song) is a new performance or recording of a previously performed or recorded musical composition, herein referred to as a cover-media content item. In embodiments, unidentified media content items are identified as cover-media content items by comparing a set of extracted features from the unidentified media content item to known features for media content items of known works. Based upon the identified cover-media content item and the known work associated with the cover-media content item, licensing rates may be determined, covers may be removed from servers, and so on. The cover-media content item may be added to a cover-media repository, and may later be searched on within a cover-media search repository.

Today many pieces of content are available to be viewed both offline and online through a diverse collection of media content sharing platforms. In one common case, a media content sharing platform will monetize an instance of media content during the presentation of the content to the end user. Monetization of media content includes displaying other content such as advertisements and/or promotional media alongside, before, or after presenting the media content item. Interested parties, such as a content sharing platform, a user uploading a media content item, a media content item owner, or a media content item publisher may wish to determine whether the media content item is a cover-media content item of a known work so that licensing rates may be applied for the cover-media content item and/or the cover-media content item may be removed from the media content sharing platform. A media content identification service may receive the unidentified media content item for processing locally or remotely over a network.

Popularity of media content sharing platforms is ever increasing. The user bases for popular media content sharing platforms have already expanded to over a billion users. An active set of these users is uploading user generated content. User generated content (UGC) may include a cover of the work of another that is subject to copyright protections (e.g., video or audio known works). Every new instance of user generated content generally should be analyzed for copyright compliance against existing known works that have been registered for protection. A media content identification service can receive billions of transactions each and every month, where each transaction involves the analysis of a media content item.

Traditional identification services may match digital fingerprints of the user generated content to registered known works when the user generated content is either an exact match or near match to the digital fingerprint of a registered known work. However cover-media content items in many cases are contemporary versions of original works where a modification to the tempo, musical arrangement, or other audio features has been made. As a result, traditional identification services are not generally capable of identifying covers of works (e.g., matching cover-media content items to their associated original work). Embodiments of the present disclosure provide a cover identification service that determines whether new media content items include covers of works.

In an embodiment, a media content sharing platform (e.g., such as YouTube®, Vimeo®, Wistia®, Vidyard®, Sprout-Video®, Daily Motion®, Facebook®, etc.) provides an unidentified media content item, which has been uploaded by a user, to a media content identification service as input. The media content identification service may determine features for the unidentified media content item. The media content identification service may determine metadata associated with the unidentified media content item. The media content identification service may determine a first similarity between the metadata of the unidentified media content item and additional metadata associated with a known media content item of a plurality of media content items from a media content repository. The media content identification service may determine a second similarity between the determined set of features of the unidentified media content item and an additional set of features association with the known media content item. The media content identification service may identify the unidentified media content item as a cover of the known media content item based upon the first similarity of the metadata and the second similarity of the set of features.

In an embodiment, the media content identification service may further update the metadata of the unidentified media content item to include cover information that identifies the unidentified media content item as a cover of the known media content item.

In an embodiment, the metadata within the unidentified media content item may include a metadata description attribute that describes the unidentified media content item.

In an embodiment, the media content identification service may further compare the metadata associated with the unidentified media content item with additional metadata associated with two or more of the plurality of known media content items. The media content identification service may determine similarity values for each of the two or more of the plurality of known media content items based on the comparison. The similarity values may represent a similarity between metadata associated with a known media content item and the metadata associated with the unidentified media content item. The media content identification service may determine a set of known media content items that have similarity values that meet or exceed a similarity threshold. The media content identification service may compare the set of features of the unidentified media content item to sets of features of each of the known media content items in the set of known media content items.

In an embodiment, the media content identification service may, when determining the first similarity between the metadata associated with the unidentified media content item and the additional metadata associated with the known media content item, normalize the metadata of the unidentified media content item to generate a normalized descriptive text for the unidentified media content item. The media content identification service may compare the normalized descriptive text of the unidentified media content item with normalized descriptive text of the known media content item. The normalized descriptive text of the known media content item may be based on the additional metadata associated with the known media content item. The media content identification service may generate a similarity score between the normalized descriptive text of the unidentified media content item and the normalized descriptive text of the known media content item. The media content identification service may determine that the similarity score is above a similarity threshold.

In an embodiment, the normalized descriptive text of the known media content item may be stored within a normalized text repository of descriptions for the plurality of known media content items. The normalized text repository may include an inverted index of normalized words and trigrams generated from textual descriptions from metadata attributes associated with the plurality of known media content items. The normalized descriptive text of the unknown media content item may additionally include normalized words and trigrams generated from a textual description of the metadata associated with the unknown media content item.

In an embodiment, the media content identification service may, when generating the similarity score between the normalized descriptive text of the unidentified media content item and the normalized descriptive text of the known media content item, determine a match count by counting a number of words and trigrams that match between the normalized descriptive text of the unidentified media content item and the normalized descriptive text of the known media content item. The media content identification service may divide the match count by a greater of either a) a number of words from the normalized descriptive text of the unidentified media content item or b) a number of words from the normalized descriptive text of the known media content item.

In an embodiment, the media content identification service may, when determining the set of features for the unidentified media content item, determine a beat of the unidentified media content item. The media content identification service may divide the unidentified media content item into a plurality of segments. For each segment, the media content identification service may determine a plurality of signal-based vectors that represent at least one of pitch, timbre, or rhythm for the segment. The media content identification service may normalize the plurality of signal-based vectors based on the beat. The media content identification service may generate the set of features from the normalized plurality of signal-based vectors.

In an embodiment, the media content identification service may, in response to identifying the unidentified media content item, store an entry for the identified cover-media content item in a covers content repository. The entry may represent a link between the identified cover media content item and the known media content item. The covers content repository may maintain relationships between cover-media content items that have been identified as cover performances of known media content items and the known media content items.

In an embodiment, the media content identification service may further receive a request for cover-media content items that are covers of a known media content item. The request for the cover-media content items may include an identifier identifying the known media content item. The media content identification service may generate a dataset of cover-media content items that are covers of the known media content item. The media content identification service may send the dataset back to a requestor.

In an embodiment, the request for cover-media content items may include an indication of a specified genre. The media content identification service may, when generating the dataset of cover-media content items from the covers content repository, select a subset of the covers of the known media content item that have the specified genre. In an embodiment, the specified genre in the request may be a different genre from a genre associated with the known media content item.

In an embodiment, the media content identification service may further receive a request for cover performers associated with the known media content item. The media content identification service may determine, from the covers content repository, cover-media content items that are covers of the known media content item and may determine cover performers of the cover-media content items. The media content identification service may provide a dataset comprising the cover performers of the cover-media content items.

In an embodiment, the request for cover performers associated with the known media content item may include a request for top cover performers of the known media content item. The media content identification service may select a subset of top cover performers from the determined cover performers of the cover-media content items based on one or more performance metrics and/or performer metrics. The one or more performance metrics and/or performer metrics may include at least one of a number of cover-media content items associated with a specific performer or a total number of views of the cover-media items associated with the specific performer.

In an embodiment, the media content identification service may further generate a dataset of cover-media content items that are covers of the known media content item from the covers content repository. The media content identification service may determine a rights holder for the known media content item. The media content identification service may determine a resource allocation for the rights holder based upon the dataset of cover-media content items.

Identification of the unidentified media content item may be based on a determined first similarity, a determined second similarity, or both the determined first and second similarities. The determined first similarity may be a similarity between descriptive text in metadata of the unidentified media content item and metadata in a known media content item. In an embodiment, the media content identification service may further determine a dynamic threshold for the second similarity based on the first similarity. The media content identification service may determine whether the second similarity exceeds the dynamic threshold. The media content identification service may identify the unidentified media content item as the cover of the known media content item responsive to determining that the second similarity exceeds the dynamic threshold.

In an embodiment, the media content identification service may receive an unidentified media content item. The media content identification service may determine a set of features of the unidentified media content item. The media content identification service may determine a first similarity between the set of features of the unidentified media content item and an additional set of features associated with a known media content item of a plurality of known media content items from a media content repository. The media content identification service may identify the unidentified media content item as a cover of the known media content item based on the first similarity, resulting in an identified cover-media content item. The media content identification service may determine a publishing rights holder of the known media content item. The media content identification service may determine a publishing resource allocation for the identified cover-media content item.

FIG. 1 is a block diagram illustrating a network environment 100 in which embodiments of the present invention may operate. In one embodiment, network environment 100 includes one or more computing devices (e.g., computing device 101A and computing device 101B, server computing device 150), and network 131 over which computing device 101A, computing device 101B, and server computing device 150 may communicate. Any number of computing devices 101A-B can communicate with each other and/or with server computing device 150 through network 131. The network 131 can include a local area network (LAN), a wireless network, a telephone network, a mobile communications network, a wide area network (WAN) (e.g., such as the Internet) and/or similar communication system. The network 131 can include any number of networking and computing devices such as wired and wireless devices.

The computing devices 101A-B and server computing device 150 may include one or more physical machines and/or virtual machines hosted by physical machines. The physical machines may include rackmount servers, desktop computers, and/or other computing devices. In one embodiment, the computing devices 101A-B and/or server computing device 150 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Network environment 100 includes one or more computing devices 101A-B for implementing one or more media content sharing platforms 175A-B which receive user uploads of user generated content. Such user generated content may then be accessible to other users. User generated content includes media content items that have been uploaded to the media content sharing platform. Such media content items may include copyrighted material in many instances.

The media content sharing platform 175A-B may engage with a media content identification service 170 hosted by server computing device 150. After a media content item is uploaded to the media content sharing platform 175A-B, the computing device 101A may provide the media content item to the server computing device 150 for identification by identification service 170. The media content item may be provided to server computing device 150 as a single file or multiple files (e.g., as a portion of a larger file). Alternatively, one or more digital fingerprints (e.g., sets of features) of the media content item may be generated and provided to identification service 170. In one embodiment, a computing device 101A-B divides a media content item into multiple segments, and one or more segments (or a digital fingerprint of one or more segments) are sent to server computing device 150. Alternatively, a digital fingerprint of the media content item may be determined from the whole of the media content item and transmitted to the server computing device 150. In addition to sending one or more digital fingerprints of a media content item and/or one or more segments of the media content item, the media content sharing platform 175A-B may also send metadata associated with the media content item. The digital fingerprints (e.g., feature vectors or other sets of features) and metadata are discussed in greater detail below.

In one embodiment, computing device 101A hosts a media content sharing platform 175A and may include storage 111A for storing an Operating System (OS), programs, and/or specialized applications to be run on the computing device. Computing device 101A may further include storage 112A for storing media content items of the media content sharing platform 175A. The media content items may also be stored remote (not shown) to computing device 101A and retrieved from the remote storage.

In one embodiment, computing device 101B hosts an additional media content sharing platform 175B and may include storage 111B for storing an Operating System (OS), programs, and/or specialized applications to be run on the computing device. Computing device 101B may further include storage 112B for storing media content items of the additional media content sharing platform. Media content items 142 may also be stored in remote storage 140 and retrieved from the remote storage 140 for access and playback by users. In one embodiment, remote storage 140 is a storage server, and may be configured as a storage area network (SAN) or network attached storage (NAS).

Server computing device 150 includes a media content identification service 170 that can identify media content items. In an embodiment, the media content identification service 170 may include a cover identification controller 200, a machine learning profiler 155, a media identifier 160, licensing logic 162, communication logic 164, and cover search logic 166. The server computing device 150 may communicate with storages 145A-D that store known media content items 147A-B, normalized text of known media content items 143, and cover-media content items 149. The storages 145A-B can be magnetic storage units, optical storage units, solid state storage units, storage servers, or similar storage units. The storages 145A-B can be monolithic devices or a distributed set of devices. A 'set,' as used herein, refers to any positive whole number of items including one. In some embodiments, the storages 145A-B may be a SAN or NAS.

The known media content items 147A-B may be media content items that have a known classification and/or a known identification. Additionally, one or more digital fingerprints of the known media content items 147A-B may be stored in storages 145A-B. The digital fingerprints associated with a media content item may include first digital fingerprints generated using a first fingerprinting module (e.g., a fingerprinting module that generates digital fingerprints usable to identify an unknown media content item as a copy or same performance of a known media content item) and/or second digital fingerprints generated using a second fingerprinting module (e.g., a fingerprinting module that generates digital fingerprints usable to identify an unknown media content item as a cover or different performance of a known media content item). Licensing information about the known media content items 147A-B may also be stored. Metadata associated with the known media content items 147A-B may also be stored. In embodiments, normalized text of known media content items 143 may include an index of metadata (e.g., descriptive text) describing the known media content items 147A-B. The cover-media content items 149 may be media content items that have been identified as cover versions of original works. Metadata describing attributes of the cover-media content items 149 and/or one or more digital fingerprints of the cover-media content items 149 may also be stored in storage 145D. In other embodiments, any one of the storages 145A-D may be configured to store any one of or a combination of the known media content items 145A-B, index of known media content items 143, and cover-media content items 149.

The communication logic 164 may send and receive data associated with media content items to be identified. The data may be received from a remote computing device (e.g., a media content sharing platform running on a remote computing device). Received data may be an entire media content item (e.g., an entire file), one or more segments of a media content item, a set of features of a media content item (e.g., a digital fingerprint of the media content item), a set of features of a segment of a media content item (e.g., a digital fingerprint of a segment of the media content item), and/or metadata associated with the media content item. The received data may be provided to any of the other processing blocks such as the media identifier 160, the licensing logic 162, the cover identification controller 200, the machine learning profiler 155, and/or the cover search logic 166. The communication logic 164 may also send and receive data from the various storage repositories including storage 145A-145D.

Media content items are classified in embodiments using machine learning profiles and/or machine learning models (i.e., profiles and models produced using machine learning techniques). Server computing device 150 may receive a collection of media content items, which may be used to train a machine learning profile and/or model. The media content items may be provided as an input to a machine learning profiler 155 as part of a training data set to generate the profiles and/or models. The machine learning profiler 155 may perform supervised machine learning to identify a set of features that are indicative of a first classification and another set of features that are indicative of another classification. The first set of features indicative of the first classification (e.g., indicative of music) may be defined in a first model and a second set of features indicative of the second classification (e.g., lack of music) may be defined in a second model. Alternatively, profiles may be generated for more than two classifications.

Machine learning profiler 155 may generate machine learning profiles for identifying one or more classes of media content items. For example, the machine learning profiler 155 may generate a profile for identifying, for media content items having audio, whether the audio comprises music or does not comprise music. Similarly, the machine learning profiler 155 may generate a profile for identifying, for audio, a classification wherein the audio comprises a particular categorization of music (e.g., a genre including rock, classical, pop, etc.; characteristics including instrumental, a cappella, etc., and so on). The machine learning profiler 155 may generate a profile for identifying, for media content items including video, a classification wherein the video comprises a categorization of movie (e.g., a genre including action, anime, drama, comedy, etc.; characteristics including nature scenes, actor screen time, etc.; recognizable dialogue of famous movies, and so on). A machine learning profile generated by machine learning profiler 155 may be provided to a cover identification controller 200 and/or media identifier 160. The machine learning profiler 155 may communicate with storages 145A-B that store known media content items 147A-B.

The media identifier 160 may be configured to determine whether a received media content item is a copy of a known media content item. In an embodiment, the media identifier 160 may receive the media content item, segments of the media content item, and/or one or more fingerprints of the media content item from computing device 101A or 101B. For example, the communication logic 164 may receive an unidentified media content item from computing device 101A and send the unidentified media content item to the media identifier 160 to determine whether the unidentified media content item is a copy of a known media content item. Determining whether an unidentified media content item is a copy of a known media content item may be different from determining whether the unidentified media content item is a cover of a known media content item.

Digital fingerprints are compact digital representations of a media content item (or a segment of a media content item) extracted from a media content item (audio or video) which represent characteristics or features of the media content item with enough specificity to uniquely identify the media content item. Original media content items (e.g., known works) may be registered to the identification service, which may include generating a plurality of segments of the original media content item. Digital fingerprints may then be generated for each of the plurality of segments. Fingerprinting algorithms encapsulate features such as frame snippets, motion and music changes, camera cuts, brightness level, object movements, loudness, pitch, brightness, spectral bandwidth, energy in one or more spectral bands, spectral steadiness, Mel-frequency cepstral coefficients (MFCCs), and so on. The fingerprinting algorithm that is used may be different for audio media content items and video media content items. Additionally, different fingerprinting algorithms may be used to generate digital fingerprints usable to identify a copy of a known work and to generate digital fingerprints usable to identify a cover of a known work. Digital fingerprints generated for a registered work are stored along with content metadata in a repository such as a database. Digital fingerprints can be compared and used to identify media content items even in cases of content modification, alteration, or obfuscation (e.g., compression, aspect ratio changes, re-sampling, change in color, dimensions, format, bitrates, equalization) or content degradation (e.g., distortion due to conversion, loss in quality, blurring, cropping, addition of background noise, etc.) in embodiments. Additionally, or alternatively, digital fingerprints may be usable to identify covers of known media content items.

The digital fingerprint (or multiple digital fingerprints) of the unknown media content item may be compared against the digital fingerprints of all known works registered with a licensing service. In some embodiments, media identifier applies an unknown media content item, one or more segments of the unknown media content item, set of features of the unknown media content item, or digital fingerprint(s) of the unknown media content item to a trained machine learning profile. The trained machine learning profile may then classify the unknown media content item as music or as not music. If the unknown media content item is classified as containing music, the media identifier may compare digital fingerprints of the unknown media content item to digital fingerprints of known works that also contain music. This may reduce the processing resources utilized to match the digital fingerprint. Once the digital fingerprint of the received media content item has matched an instance of a known work, the media content item is identified as being a copy of the known work.

The identification service may then determine one or more actions to take with regards to the media content item that has been identified. For example, the media content item may be tagged as being the known work, advertising may be applied to the media content item and licensing revenues may be attributed to the owner of the rights to the known work (e.g., by licensing logic 162), the media content item may be removed from the media content sharing platform, and so on. In some instances, the media identifier 160 may be hosted by a different server computing device than the server computing device 150.

The cover identification controller 200 may determine whether the unidentified media content item is a cover version of a known media content item or whether the unidentified media content item is an original work itself. In an embodiment, the cover identification controller 200 may extract one or more sets of audio features from the unidentified media content item, transform the audio features, and compare the transformed audio features to features of the known media content items 145A-B. The transformed set of audio features may make up one or more digital fingerprints of the unidentified media content item. The cover identification controller 200 may also identify metadata from the unidentified media content item and perform a comparison to the metadata associated with known media content items (e.g., to the index of known media content items 143) in order to determine similarities between the metadata associated with the unidentified media content item and the metadata associated with known media content items 145A-B. Further details of the cover identification controller 200 are described in FIG. 2 which includes an example embodiment of components and logic within the cover identification controller 200.

Computing device 101B may include a cover identification controller 200A in some embodiments. Cover identification controller 200A may perform the same operations as described above with reference to cover identification controller 200. However, cover identification controller 200A may be located at a site of the media content sharing platform 175B so as to minimize network bandwidth utilization. Media content sharing platform 175B may provide an unidentified media content item (or segment of the unidentified media content item, or extracted features of the unidentified media content item) to the cover identification controller 200A for feature identification and/or media content item identification prior to sending the unidentified media content item (or segment of the unidentified media content item, extracted features of the unidentified media content item or a digital fingerprint of the unidentified media content item) across the network 131 to server computing device 150. Cover identification controller 200A may identify the unidentified media content item as described above. By first determining identifying digital features of unidentified media content items at the computing device 101B and only sending data associated with those unidentified media content items to server computing device 150 network bandwidth utilization may be significantly decreased.

Once a media item is identified as a cover of a known media item, that media item may be linked to the known media item in one or more of storages 145A-D. All covers of a known media item may be linked to that media item in the storage(s) 145A-D. Covers may also link to other covers of the same known media item.

In some instances, after determining that the unidentified media content item is a cover of a known content item, the cover identification controller 200 may invoke the licensing logic 162. The licensing logic 162 may be invoked to determine a licensing rate to apply to a cover media content item or a group of cover media content items. Cover songs may vary aspects of the original work and thereby may include input based on both the original work and the performer's input in modifying the original work. As a result, licensing rates between cover songs of an original work and exact copies of an original work may be calculated differently. Licensing logic 162 may determine a licensing rate that a media content sharing platform 178A-B is to pay for user generated content that is a cover of a particular known media content item. In one embodiment, licensing logic 162 determines a licensing rate to apply to a cover media content item based on licensing and royalty rates that may be applied to the cover media content item.

Identified cover-media content items may be stored as cover-media content items 149 within storage 145D to create a repository of covers of known works. A cover repository may be beneficial to media content item owners, publishers, labels, and even consumers of the cover-media content items. For instance, the cover repository may be a searchable resource for content owners, publishers, and labels to search for covers of original media items for the purpose of determining publishing rights, compliance and licensing requirements, and for calculating royalty and licensing rates. Additionally, music labels and/or publishers may query the cover repository to discover new and rising performers. For example, a music label may wish to query the cover repository to find the most popular cover artists based upon different metrics. Then music labels may want to reach out to a popular cover artist for the purpose of signing the artist to their music label.

Publishers and music labels may also benefit from the cover repository to query musical trends based upon fans who consume the cover songs. For example, music labels may, in conjunction within the media content sharing platform, query the cover repository to determine which types of fans are interested in which performers. These metrics may then be used to target music content and different performers for consumers.

In some instances, requests to search for identified cover media content items may be received by the communication logic 164. The communication logic 164 may invoke the cover search logic 166 to determine one or a set of cover media items associated with a particular known media item, a particular performer of the cover media items, a particular performer of the known media item being covered in the cover media items, and so on. The cover search logic 166 may search the cover media items 149 in storage 145D for cover media items that match the particular known media item and/or that match particular properties of the known media content item and/or metadata associated with the particular known media item. The cover search logic 166 may focus the search to a particular genre of cover media items and generate a set of cover media items that are of a particular genre or a group of genres. Alternatively the cover search logic 166 may filter the cover media items 149 based upon one or more genres in order to generate a set of cover media items that cover genres other than the filtered one or more genres. The cover search logic 166 may search the cover media items 149 for a subset of performers identified within the cover media items 149 and generate a set of cover media items based upon the subset of performers.

Figure 2:
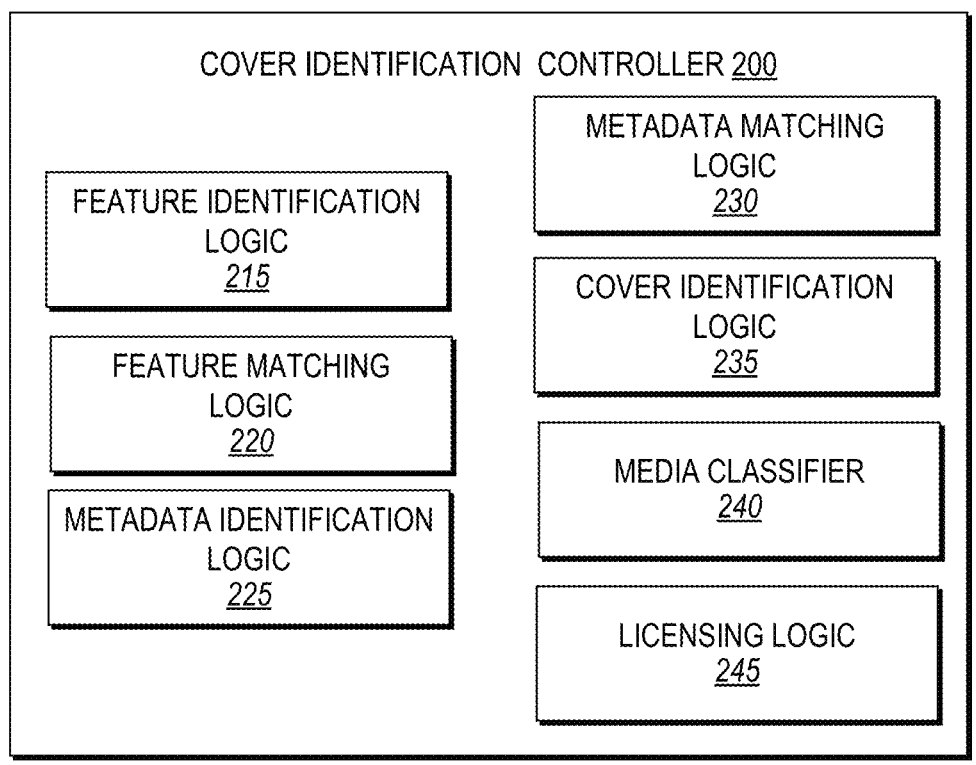
FIG. 2 is a block diagram illustrating a cover identification controller, according to an embodiment.

FIG. 2 is an example cover identification controller 200 in accordance with some implementations of the disclosure. In general, the cover identification controller 200 may correspond to the cover identification controller 200 of server computing device 150 as shown in FIG. 1. In an embodiment, the cover identification controller 200 may include a feature identification logic 215, a feature matching logic 220, a metadata identification logic 225, a metadata matching logic 230, a cover identification logic 235, a media classifier 240, and a licensing logic 245. Alternatively, one or more of the logics and/or modules of the cover identification controller 200 may be distinct modules or logics that are not components of cover identification controller 200. For example, licensing logic 245 may be distinct from cover identification controller 200 as described with reference to FIG. 1. Additionally, or alternatively, one or more of the modules or logics may be divided into further modules or logics and/or combined into fewer modules and/or logics.

In an embodiment, feature identification logic 220 may be invoked to determine features of one or more segments of a media content item that is to be identified. Features may include digital fingerprints, such as second digital fingerprints, that may be beat-synchronized digital fingerprints. Beat-synchronized digital fingerprints may capture features such as pitch, timbre, and rhythm that have been normalized to be tempo-invariant. The benefit to identifying features and generating beat-synchronized digital fingerprints is that comparisons may be made between cover works and original works even when the tempo, instrumentation, and vocals type vary significantly between the two works. Beat identification may be used to identify one or more segments within an unidentified media content item. Normalization may include down-scaling features to an individual beat.

A segment of the unidentified media content item may be received from the communication logic 164 and may be analyzed with respect to a set of features including loudness, pitch, beat, timbre, rhythm, brightness, spectral bandwidth, energy in one or more spectral bands, spectral steadiness, Mel-frequency cepstral coefficients (MFCCs), and so on. Feature identification logic 220 may determine values for some or all of these features, and may generate a feature vector for the segment that includes the determined feature values. The feature vector may be a digital fingerprint of one or more segments of the media content item.

In some implementations, feature vectors (e.g., digital fingerprints) of one or more segments of the media content item are generated remotely (e.g., by a remote computing device executing a media content sharing platform), and such feature vector(s)/digital fingerprint(s) are received from the remote computing device rather than the segments of the media content item. The feature vector(s)/digital fingerprint(s) may be received along with metadata associated with the unknown media content item rather than receiving the media content item. This may reduce network bandwidth utilization.

The set of features (e.g., the feature vector(s) or digital fingerprint(s)) determined by the feature identification logic 215 may be provided to the feature matching logic 220 to determine whether the set of features of the unidentified media content item is similar to a defined set of features for a known content item. For example, the set of features of the unidentified media content item may be compared to sets of defined features (digital fingerprints) of multiple known content media items.

In one implementation, a comparison between a digital fingerprint/feature vector of the unknown media content item and a digital fingerprint/feature vector of a known media content item may be performed by computing self-similarity matrices for each of the feature types for the unidentified media content item and the known content media item. Self-similarity matrices may be used to determine similarities of features within a media content item. In an embodiment, self-similarity matrices may be generated by calculating Euclidean distances between feature vectors within the media content item. Additionally, cross-similarity matrices may be computed for each feature type between the unidentified media content item and the known content media item. Cross-similarity matrices may be used to measure the similarities between the two different media content items. In an embodiment, cross-similarity matrices may be generated by calculating Euclidean distances between possible pairs of feature vectors from each media content item. In other embodiments, cross-similarity matrices may be calculated differently depending on the feature vectors. Generation of cross-similarity matrices and self-similarity matrices are further described herein.

The cross-similarity matrices and the set of self-similarity matrices may then be fused using Similarity Network Fusion (SNF) techniques. SNF is a computational method for data integration by constructing a sample similarity network for each of the data types and then iteratively integrating the networks using network fusion. The resulting matrices may then be transformed into a binary cross-recurrence plot, which is a plot showing, at a given moment of time, the instances an occurrence of where a feature occurs. In one implementation, the binary cross-recurrence plot may then be scored using a Smith-Waterman algorithm to determine a similarity score between the unidentified media content item and the known media content item. In other implementations, the feature matching logic 220 may implement other matching algorithms to determine the similarity between the features/digital fingerprints of the unidentified media content item and the features/digital fingerprints of the known media content item.

In one embodiment, for each comparison of the feature vector(s)/digital fingerprint(s) of an unknown media content item to the feature vector(s)/digital fingerprint(s) of a known media content item, a feature similarity score is computed. The feature similarity score may indicate a level of similarity between the audio features of the unknown media content item and the audio features of the known media content item.

In an embodiment, the metadata identification logic 225 may identify descriptive text stored in metadata of the unidentified media content item. Such descriptive text may be determined from a received media content item. Alternatively, or additionally, the descriptive text may be determined from received metadata that is associated with the media content item. The descriptive text may be normalized and processed using one or more word matching algorithms and/or trigram matching algorithms. Text normalization is a process of transforming text into a canonical form. For instance, different ways of writing the term "two hundred dollars" may include "$200", "200 bucks", and "2 Benjamins." Text normalization may process the inputting text, such as the examples described, and transform each of them into the canonical form of "two hundred dollars." Normalized descriptive information associated with an unknown media content item may be compared to normalized descriptive information associated with known media content items to determine whether the unidentified media content item is a cover of a known media content item and/or to narrow identification of a known media content item as a cover to a subset of the known media content items 145A-145B. For example, the unidentified media content item may be associated with metadata comprising the description of "Rolling Stones." This metadata may be used to determine a subset of known media content items that match the artist Rolling Stones. Processing resources may be conserved when identifying an unidentified media content item if the pool of known media content items to compare against is narrowed to a subset of known media content items.

In an embodiment, the metadata matching logic 230 may be invoked by the metadata identification logic 225 following the identification of descriptive text from metadata of the unidentified media content item. The metadata matching logic 230 may compare the metadata associated with the unidentified media content item to additional metadata associated with a known media content item. Using the previous example of metadata containing "Rolling Stones," the metadata matching logic 230 may compare the unidentified media content item metadata to the index of known media content items 143 in order to determine a subset of similar known media content items that have associated metadata that is similar to the metadata of the unidentified media content item, "Rolling Stones."

In one embodiment, for each comparison of the metadata of an unknown media content item to the metadata of a known media content item, a metadata similarity score is computed. The metadata similarity score may indicate a level of similarity between the metadata of the unknown media content item and the metadata of the known media content item. In an embodiment, the cover identification logic 235 may be invoked to determine whether the unidentified media content item is a cover of a known media content item. The cover identification logic 235 may use either or both of the similarity determinations (e.g., the feature similarity score and/or the metadata similarity score) generated from the feature matching logic 220 and the metadata matching logic 230. In an embodiment, the cover identification logic 235 may use a configured similarity threshold to determine whether the similarity scores provided by either or both the feature matching logic 220 and the metadata matching logic 230 exceed the similarity threshold for determining whether the unidentified media content item is a cover of a known media content item.

Upon determining that the unidentified media content item is a cover of a known media content item, the media classifier 240 may be invoked. In an embodiment, the media classifier 240 may store the unidentified media content item as a cover media content item 149 within the storage 145D. The media classifier 240 may update the metadata within the cover media content item 149 to indicate that the cover media content item 149 is a cover of a known media content item. The media classifier 240 may also link the cover media content item to the known media content item in the storage (e.g., in a music identification database).

Upon determining that the unidentified media content item is a cover of a known media content item, the licensing logic 245 may be invoked to determine a licensing rate to apply to a cover media content item or a group of cover media content items.

FIGS. 3A-5 are flow diagrams illustrating various methods of identifying an unidentified media content item as a cover media item and performing actions based on a result of such identification. The methods may be performed by processing logic that comprises hardware (e.g., circuitry, dedicated logic, programmable logic, microcode, etc.), software (e.g., instructions run on a processor), firmware, or a combination thereof. The methods may be performed, for example by one or more of computing devices 101A-B and/or server computing device 150 of FIG. 1 in embodiments.

Figure 3A:
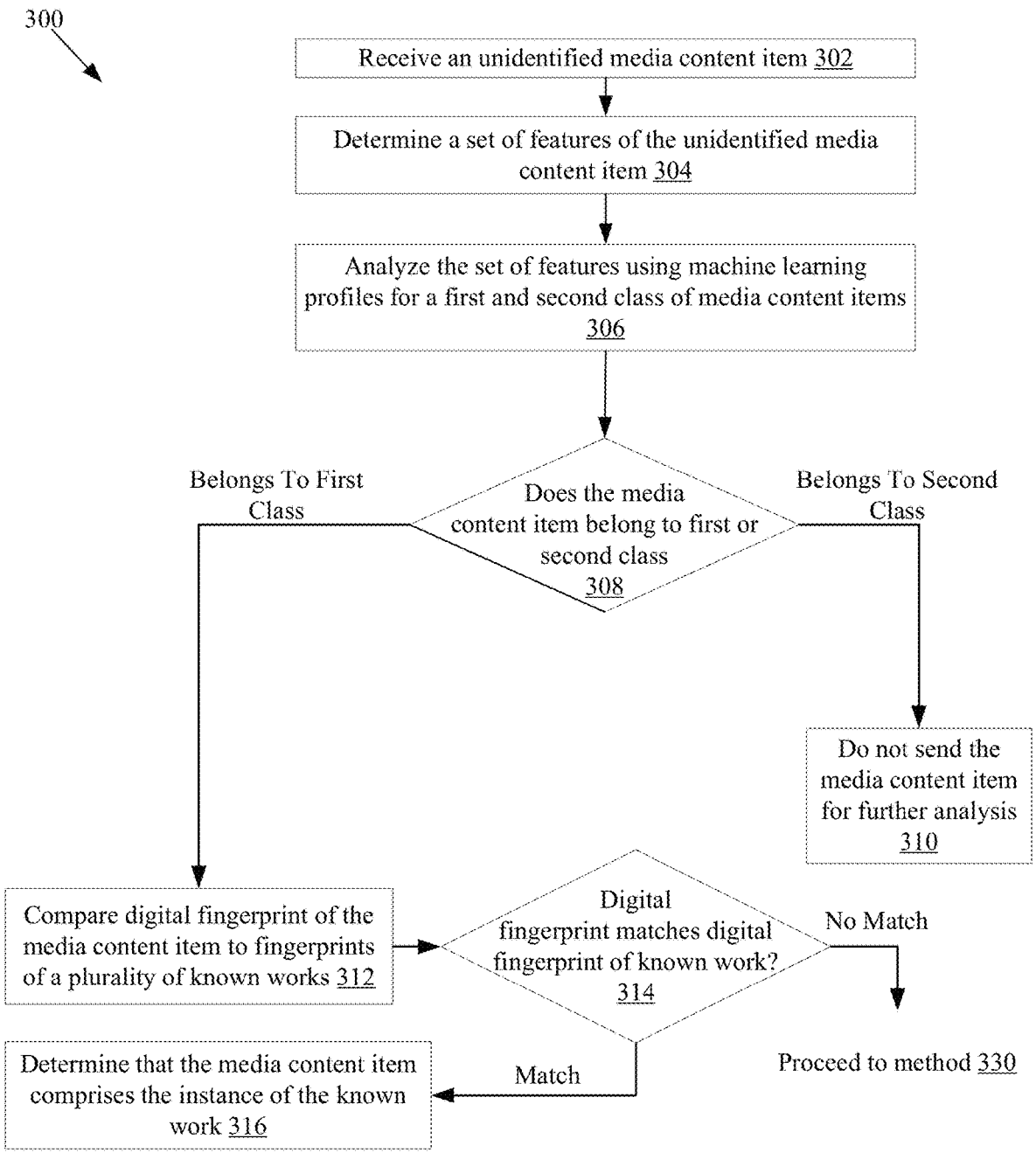
FIG. 3A is a flow diagram illustrating a method for determining whether an unidentified media content item is a musical composition, according to an embodiment.

FIG. 3A is a flow diagram illustrating one embodiment of a method for determining whether an unidentified media content item is music, a copy of a known media content item, and/or a possible cover version of a known media content item. At block 302 of method 300, processing logic receives an unidentified media content item. The unidentified media content item may be received from additional processing logic hosted by a same computing device as the processing logic executing the method. Alternatively, the media content item may be received from a remote computing device. In one embodiment, the media content item is a live stream, and the live stream is periodically analyzed. For example, a segment of the live stream may be analyzed every few minutes.

A set of features of the media content item is determined at block 304. In one embodiment, the set of features that are extracted are the set of features which optimally determine the likelihood that a media content item belongs to a classification. For example, the features that are extracted from the media content item may include the loudness envelope of the audio component of the media content item to determine the loudness at each moment in time. Features representative of the brightness of the audio (e.g., bass and treble component of the audio) may also be extracted. A derivative of the loudness envelope may be taken to identify the change in the loudness at each time. An FFT algorithm identifying other characteristics and an MFCC algorithm may be applied to identify the frequency domain characteristics and the clustered features of the media content item. Features may be extracted at an interval (e.g., 1 second interval, 0.5 second interval, 0.10 second interval). In another example, fifty two features may be extracted at multiple time intervals and used to generate a feature vector. Alternatively, more or fewer features may be extracted and used to generate a feature vector.

At block 306, the set of features is analyzed using machine learning profiles for a first and second class of media content items. In one embodiment, a single machine learning profile (also referred to herein as a media classification profile or media alteration profile) contains models for multiple different classifications of media content items. Alternatively, a separate machine learning profile may be used for each model. In one embodiment, the machine learning profiles comprise a machine learning model and other associated metadata. The extracted features of the media content item are supplied to the machine learning model(s) (e.g., as a feature vector) and an output may be generated indicating the likelihood that the media content item matches the classification of the machine learning profile. For example, a media classification profile may identify a first percentage chance that a media content item comprises audio features representative of music and a second percentage change that the media content item comprises audio features representative of a lack of music.

If at block 308 it is determined that the media content item belongs to the first class of media content items, the method continues to block 312. If it is determined that the media content item belongs to the second class of media content items, the method continues to block 310. In one embodiment, the percentage chance (or probability or likelihood) that the media content item belongs to a particular classification is compared to a threshold. If the percentage chance that the media content item belongs to a particular class exceeds the threshold (e.g., which may be referred to as a probability threshold), then the media content item may be classified as belonging to the particular class.

In some embodiments, thresholds on particular features may be used instead of or in addition to the probability threshold. For example, specific thresholds may exist for only a first feature, such as the loudness feature, or the threshold may exist for multiple features, such as both the loudness and brightness features. Thresholds and any accompanying combination of thresholds may be stored in the metadata of the associated machine learning profile. If the probability that a media content item belongs to a particular class exceeds or meets a probability threshold of the machine learning profile, then it may be determined that the media content item is a member of that particular class. If the probability fails to meet or exceed the probability threshold, then it may be determined that the media content item does not belong to the class and/or belongs to another class. In one embodiment, a machine learning profile may have a second machine learning model with its own thresholds to be applied to the media content item to determine if the media content item belongs to the second class.

At block 310, when the media content item is determined to belong to the second class of media content items, the media content item will not be sent for further analysis. For example, no additional analysis may be performed if an audio media content item is classified as not containing music. In an example, generally audio media content items are processed to determine whether the media content item matches one of multiple known audio works and/or is a cover of one of multiple known audio works, referred to as identification and cover identification, respectively. Such processing can utilize a significant amount of processor resources as well as network bandwidth resources. However, usually non-musical audio media content items are not registered for copyright protection. A significant amount of audio media content items on some media content sharing platforms may not contain music (e.g., up to 50% in some instances). Accordingly, resource utilization may be reduced by 50% in such an instance by identifying those media content items that do not contain music and then failing to perform additional processing on such media content items in an attempt to identify those media content items. A determination that the media content item belongs to a second class that will not be further analyzed reduces the bandwidth and/or processor utilization of an identification service and frees up additional processing resources for analyzing media content items that belong to the first class. In an example, the first class is for media content items which have music and are to be matched against all registered copyrighted music and the second class is for media content items which do not have music and will not match any registered copyrighted music. Determining that the media content item does not contain music removes a need to test the media content item against any registered copyrighted music, allowing the further processing to be bypassed and the method 300 to end without incurring additional bandwidth and processing resource usage.

At block 312, processing logic generates one or more first digital fingerprints of the media content item and compares the one or more first digital fingerprints of the media content item to digital fingerprints of a plurality of known works. Comparison may include determining whether consecutive segments of the first digital fingerprints of the media content item and a known work matches. Alternatively, processing logic may generate the first digital fingerprints and send them to a second processing device for comparison. At block 314, processing logic (or second processing logic) determines whether any of the digital fingerprints matches one or more digital fingerprints of a known work. If a match is found, the method continues to block 316, and the media content item is identified as being an instance of the known media content item. If at block 314 no match is found, then the method may proceed to method 330, depicted in FIG. 3B.

Figure 3B:
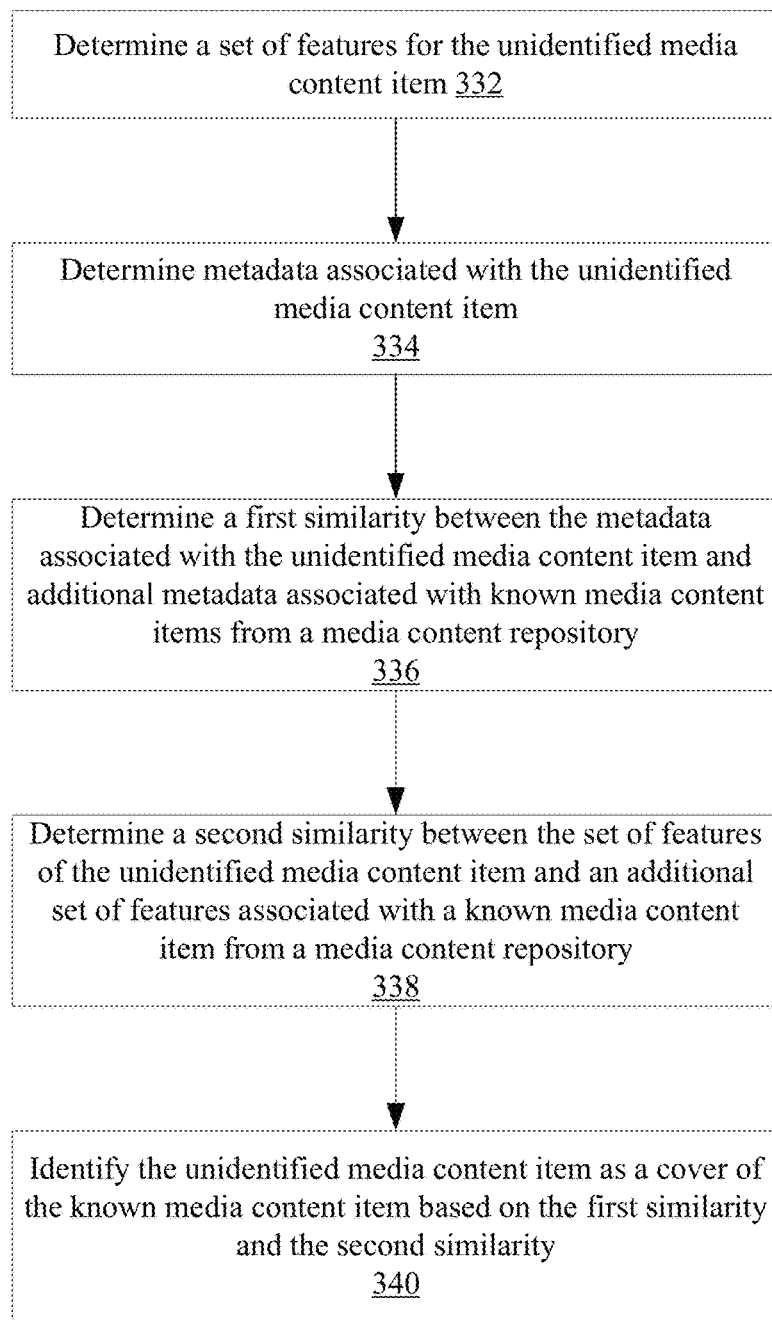
FIG. 3B is a flow diagram illustrating a method for determining an unidentified media content item as cover of a known media content item, in accordance with another embodiment.
Figure 4:
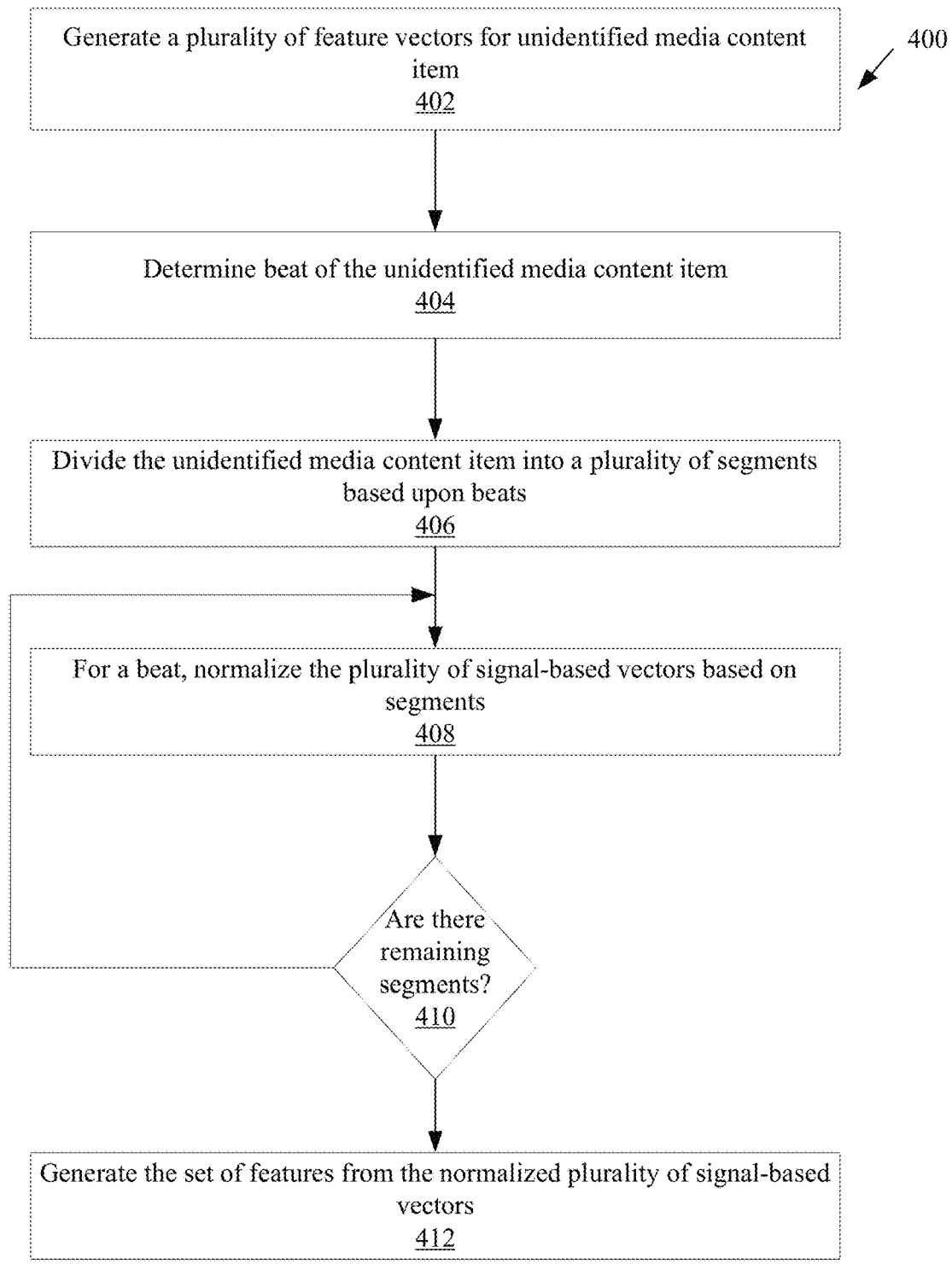
FIG. 4 is a flow diagram illustrating a method for generating a set of feature vectors for an unidentified media content item, according to an embodiment.

FIG. 3B is a flow diagram illustrating method 330 for determining whether an unidentified media content item is a cover of a known media content item. At block 332, processing logic determines a set of features for the unidentified media content item. In an embodiment, a set of feature vectors are generated based upon the set of features from the unidentified media content item. FIG. 4 is a flow diagram of method 400 illustrating an embodiment for generating a set of feature vectors for the unidentified media content item. Processing logic may generate one or more digital fingerprints that comprise the set of feature vectors and/or that are based on the set of feature vectors. In one embodiment, the digital fingerprint(s) are generated by processing logic of computing device 101A of FIG. 1. Alternatively, the digital fingerprint(s) are generated by processing of server computing device 150 of FIG. 1.

Figure 6:
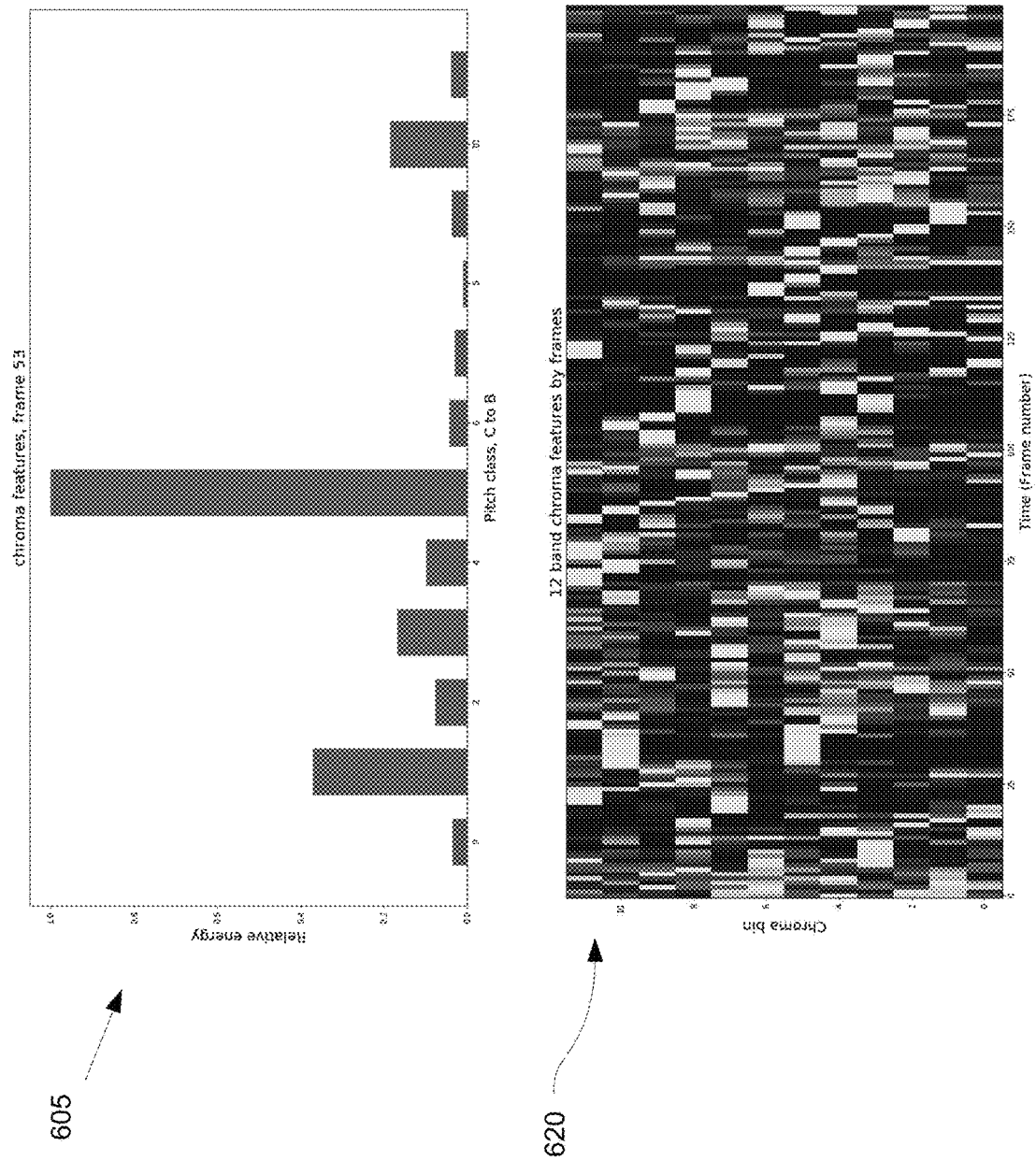
FIG. 6 depicts examples of pitch features extracted from an unidentified media content item, according to an embodiment.

At block 402, processing logic generates a plurality of feature vectors for the unidentified media content item. In an embodiment, the feature identification logic 215 determines a set of feature vectors based upon audio features including, but not limited to, pitch, timbre, and rhythm. In an embodiment, the feature identification logic 215 performs harmonic pitch class profile analysis. Harmonic pitch class profiles are a group of features extracted from an audio signal that are based on a pitch class profile. In an embodiment, the feature identification logic 215 performs harmonic pitch class profile analysis using short-time Fourier transform over a set of overlapping time windows. For example the short-time Fourier transform may be performed over a time windows of 25 milliseconds with a ¾ window overlap. Other embodiments may implement longer or shorter time windows with either larger or smaller overlaps between the time windows. This may generate a chroma feature vector for each window that contains the strength of each pitch class. FIG. 6 depicts examples of chroma features extracted from an unidentified media content item. Graph 605 of FIG. 6 illustrates a chroma feature vector of a single window. The vertical axis represents relative energy for each pitch class and the horizontal axis represents the various pitch classes divided by notes. In graph 605 the notes that have the highest relative energy are notes Db, F, and Bb, which together make a Bb minor harmony.

The processing logic generates a set of chroma feature vectors that represent the time windows that make up the entire unidentified media content item. Graph 620 of FIG. 6 illustrates a sequence of the set of chroma feature vectors for an unidentified media content item. The horizontal axis of the graph 620 represents the different feature vectors for each of the time windows, while the vertical axis represents the various pitch classes divided by notes. The higher relative energy is represented by a darker tone while lower relative energy is represented by lighter tones.

In an embodiment, the processing logic determines timbral features by computing Mel-frequency Cepstrum (MFC) from Short-Time Fourier Transform. Mel-frequency Cepstrum is a representation of a short-term power spectrum of a sound based on a linear cosine transform of a log power spectrum. In an embodiment, the processing logic generates timbral feature vectors using a time window of about 1 second with a hop size of about 25 milliseconds. The feature vectors may contain 20 MFCC's per window. In an embodiment liftering may be applied to the MFCC's to emphasize higher order MFCC's.

Figure 7A:
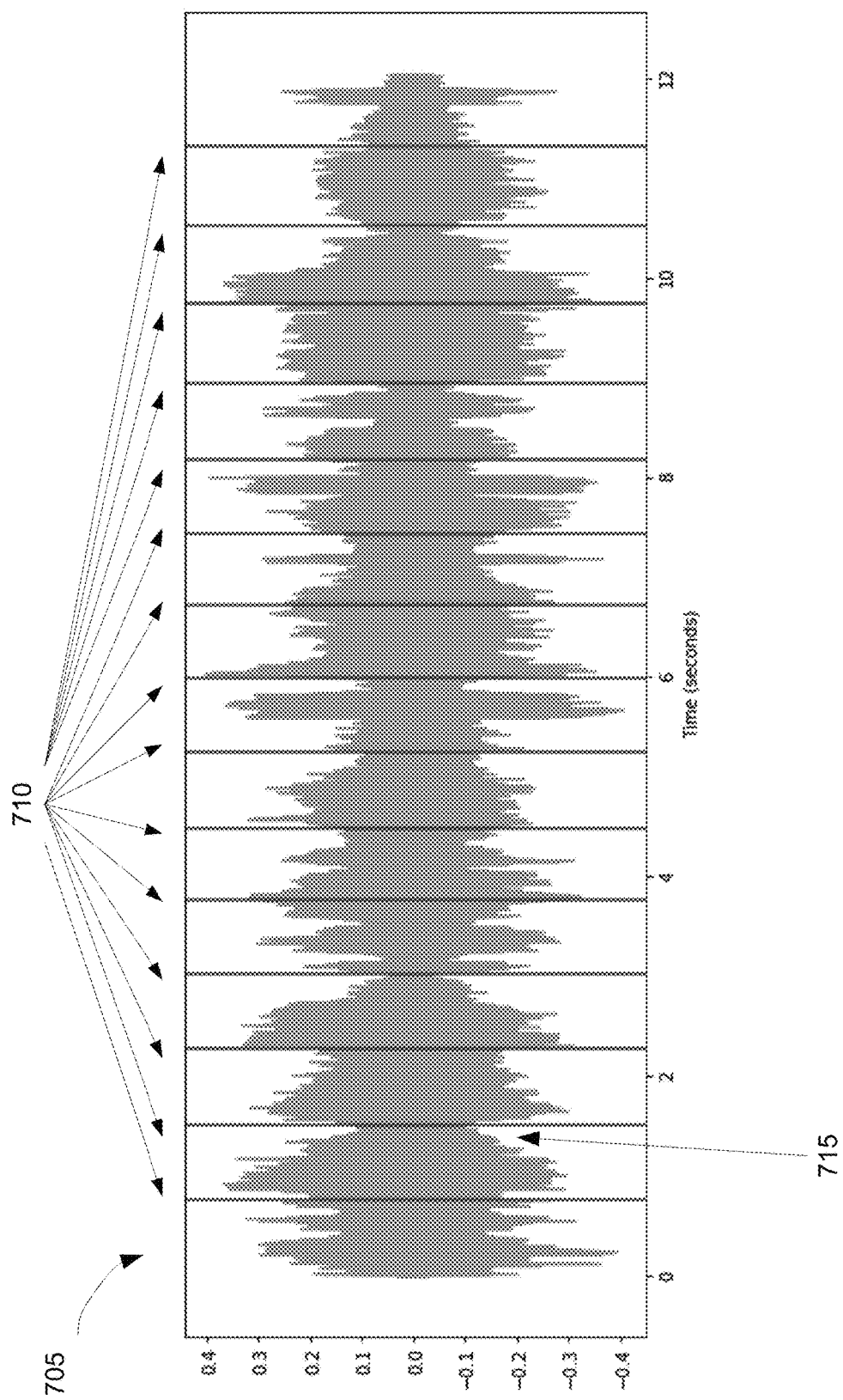
FIG. 7A illustrates Mel-frequency Cepstra over the duration of a time window for an unidentified media content item, according to an embodiment.

Referring back to FIG. 4, at block 404 processing logic determines a beat for the unidentified media content item. In an embodiment, the feature identification logic 215 determines a rhythmic structure of the audio of the unidentified media content item using MFC from Short-Time Fourier Transform. The feature identification logic 215 may identify differences between successive MFC as beats. For example, differences in MFC over time may indicate an instance of a beat. FIG. 7A illustrates MFCs over the duration of a time window for the unidentified media content item. Graph 705 of FIG. 7A illustrates the MFCs over a duration of 12 seconds. The horizontal axis represents the time and the vertical axis represents the intensity of the MFC. Lines 710 each represent at beat location where there is a relative change in intensity of the MFC. For example at location 715, the MFC intensity is about between 0.1 and −0.1, then in the next time increment the MFC intensity jumps to about 0.25 and −0.25 indicating a beat. The processing logic may determine, based on the intensity differences, beat locations relative to the time within the time window.

Referring back to FIG. 4, at block 406, processing logic divides the unidentified media content item into a plurality of segments. In an embodiment, the processing logic divides the unidentified media content item into a plurality of segments based upon the identified beat locations. For instance referring to FIG. 7A, the plurality of segments may be each of the time sections between the identified lines 710.

At block 408, processing logic, normalizes a plurality of vectors within a set of segments to generate a normalized set of feature vectors that are tempo independent. By normalizing the feature vectors based upon beat, the processing logic is able to identify the different features within each beat of the unidentified media content item. When comparing the normalized feature vectors to normalized feature vectors of known media content items, similarities may be found even when the unidentified media content item and a known media content item have different tempos. For example, a fast hard rock cover version of the Beatles' Yesterday may have a very different beats per minute tempo than the original work of Yesterday. By comparing normalized feature vectors of each version of Yesterday, similarities between the audio features may be found.

In an embodiment, for feature vectors that represent timbral features, the processing logic identifies a set of consecutive segments and then aggregates the timbral feature vectors into an array. The processing logic then z-normalizes the array of timbral feature vectors and down-scales the number of timbral feature vectors. For example, if 20 segments make up the set of segments, the processing logic may down scale 10 vectors of 20 MFCC's to generate a 200-dimensional feature vector for a single beat. The result is a set of beat-synchronized MFCCs.

In an embodiment, processing logic may perform different types of scaling and normalization based on the type of feature vector. Chroma vectors may not be normalized; instead chroma vectors may be scaled down. The processing logic may take 20 beats worth of segments and scale down the chroma vectors. For example, the set of 20 segments may contain 40 vectors of 12 pitch classes, resulting in beat-synchronized chroma vectors containing a 480-dimensional feature vector per beat.

Figure 7B:
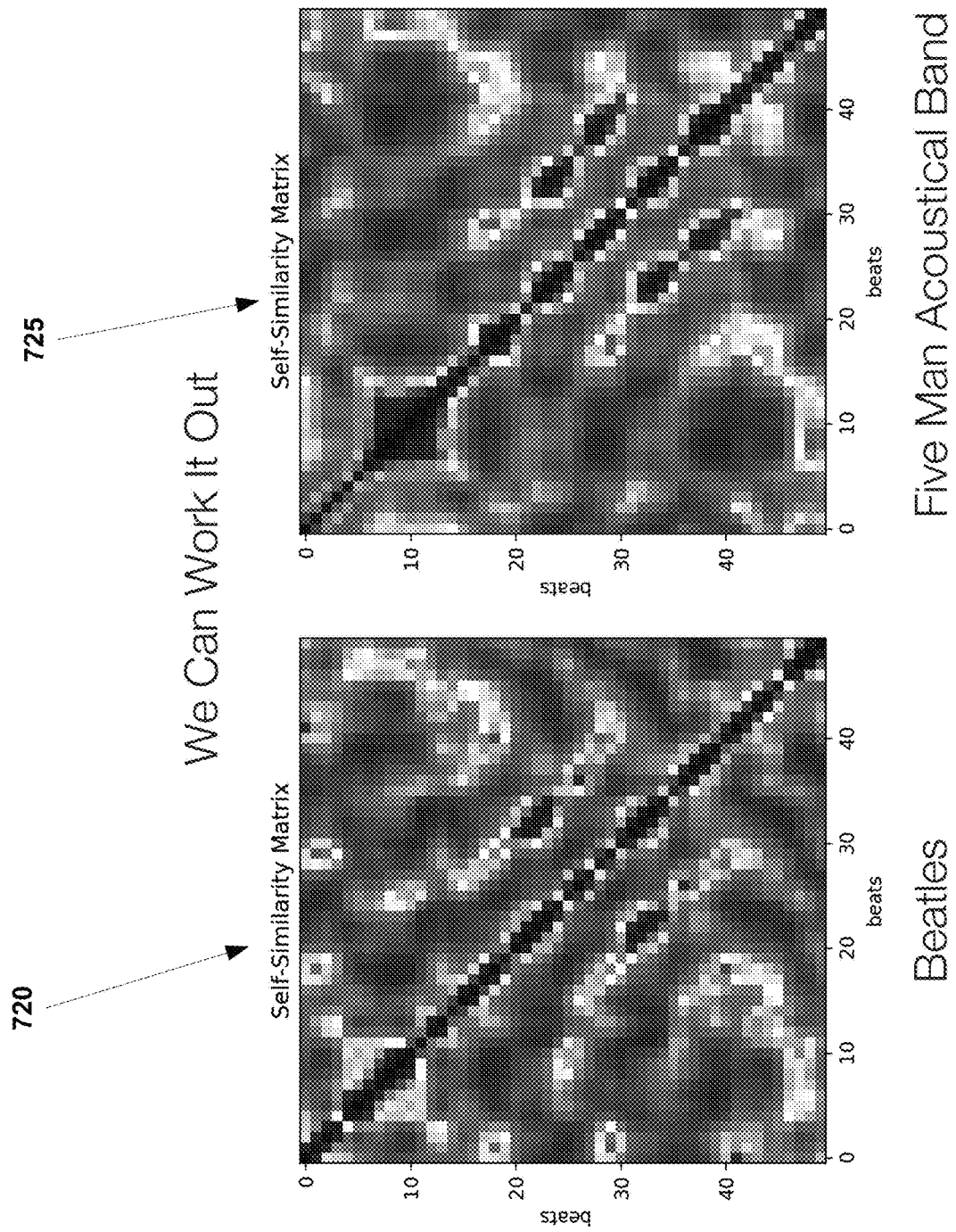
FIG. 7B illustrates an example of self-similarity matrices of beat-synchronized Mel-frequency Cepstral coefficients from a known media content item and a cover-media content item, according to an embodiment.

Different covers of original works may be performed using different instruments and using different vocal types. Beat-synchronization of timbral features may not capture similarities within these types of cover works. The feature identification logic 215 may compute blocks of self-similarity matrices (SSMs) of timbral features to normalize out the absolute timbral information, thereby leaving only relative changes. Capturing and comparing relative changes of timbral information may enable feature vector comparison to identify similarities between works that are performed in a vastly different manner than the original work. In an embodiment, the feature identification logic 215 may compute SSMs using the z-normalized beat-synchronized embedding of the MFCCs before down scaling occurs. Local SSMs may be derived by computing the Euclidean distance of each MFCC vector in the embedding to every other MFCC vector inside the 20-beat window. This may result in a large matrix which may then be scaled down, by interpolation, to a 50×50 upper-diagonal matrix and then flattened. The result is a set of beat-synchronized MFCC SSMs that include a 1250-dimensional feature vector per beat. FIG. 7B illustrates an example of SSMs of beat-synchronized MFCCs from a known media content item and a cover-media content item. Graph 720 is an illustration of the known media content item "We Can Work It Out" by the Beatles. Graph 725 is an illustration of the cover-media content item "We Can Work It Out" by the Tesla from their album "Five Man Acoustical Jam." The cover-media content item performed by Tesla is a live performance performed using acoustic instruments. As shown by graph 720 and graph 725, the positional intensity of the feature vectors of each media content item illustrate a similarity, despite the cover-media content item being a live performance recording using acoustic instruments.

At block 410, processing logic determines whether there are any remaining beats within the unidentified media content item that require normalization. If there are remaining beats, processing logic then proceeds back to block 408 to repeat the process for the next beat. If there are no more remaining beats to be normalized, processing logic proceeds to block 412. At block 412, processing logic generates a set of normalized feature vectors from the generated feature vectors at block 408. For example, the set of normalized feature vectors may include multiple sets of feature vectors representing beat-synchronized chroma vectors, beat-synchronized MFCCs, and beat-synchronized MFCC SSMs. The generated set of features may be one or more digital fingerprints of the unknown media content item.

Referring back to FIG. 3B, at block 334 processing logic determines metadata associated with the unidentified media content item. In an embodiment, the metadata identification logic 225 extracts the available metadata from the unidentified media content item. For example, metadata containing textual descriptions may include, but are not limited to, song title, artist, album, year published, year recorded, comments, track number, genre, and so on. In one embodiment, processing logic of a first computing device (e.g., computing device 101A) determines the metadata. Alternatively, processing logic of server computing device 150 may determine the metadata.

At block 336, processing logic determines a first similarity between the metadata associated with the unidentified media content item and additional metadata associated with a known media content item. If a similarity exists then there may be a likelihood that the unidentified media content item is a cover of the known media content item. For example, if the metadata from the unidentified media content item indicates the album as "Abbey Road" by the Beatles, which may be similar to metadata from a known media content item that represents a song from the Beatles album "Abbey Road", then the processing logic may determine that there is a similarity between the metadata and there is a likelihood that the unidentified media content item is a cover of the known media content item.

Figure 5:
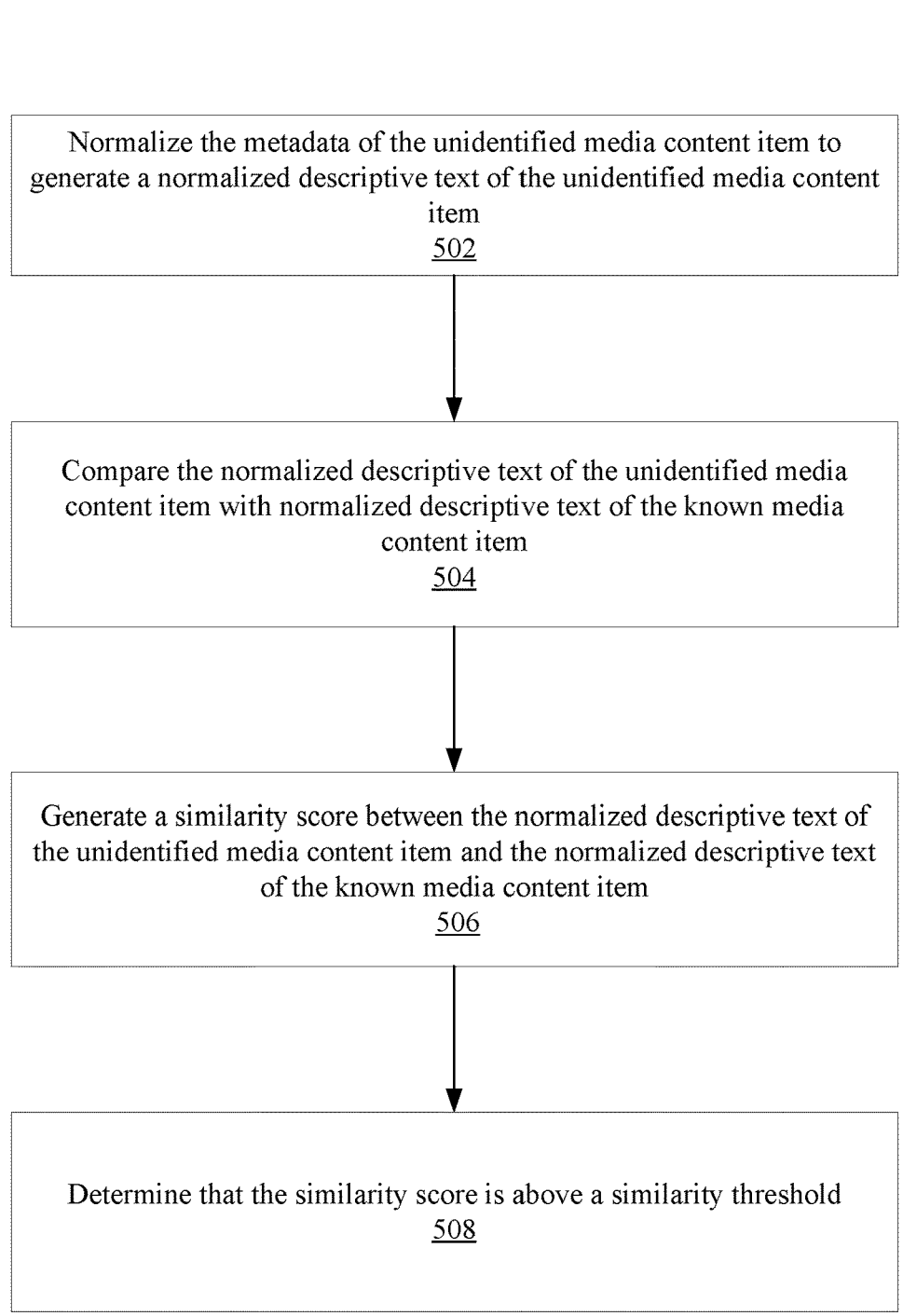
FIG. 5 is a flow diagram illustrating a method for determining whether there is a similarity between metadata of an unidentified media content item and a known media content item, according to an embodiment.

In an embodiment, the metadata matching logic 225 may retrieve additional metadata as normalized text of the known media content item 143 from storage 145C and determine whether there is a similarity between the additional metadata and the metadata associated with the identified media content item. FIG. 5 is a flow diagram illustrating a method 500 for determining whether there is a similarity between metadata of an unidentified media content item and a known media content item. At block 502, the metadata matching logic 225 may normalize the descriptive text from the metadata of the unidentified media content item. Textual normalization may improve the probability of determining a match between the unidentified media content item and a known media content item when both texts have been normalized.

At block 504, processing logic may compare the normalized descriptive text of the unidentified media content item to normalized text of a known media content item 143. In an embodiment, the normalized text of a known media content items 143 may be generated from textual descriptions from metadata extracted from known media content items. In an embodiment, the normalized descriptive text of the unidentified media content item may be compared to the normalized text of the known media content item 143 of a plurality of known media content items 147A-147B. The normalized text of the known media content items 143 stored in storage 145C may be indexed in order to increase search and comparison efficiency. In an embodiment, storage 145C may contain an inverted index of normalized words and trigrams of the normalized text of the known media content items 143.

At block 506, processing logic may generate a metadata similarity score between the normalized descriptive text of the unidentified media content item and the normalized descriptive text of a known media content item 143. In an embodiment, when generating a similarity score, the metadata matching logic 230 may determine a match count by counting the number of words and/or trigrams that match between the normalized descriptive texts of the unidentified media content item and of the known media content item. Since normalized descriptive text from the unidentified media content item and the known media content item may spell whole words differently, the trigram matching may be beneficial in identifying matches that may otherwise be missed when only comparing whole words. After identifying a match count, the metadata matching logic 230 may determine a match score as a percentage of the normalized text matched. For example, the metadata matching logic 230 may divide the match count by the greater of the number of words in either the unidentified media content item or from the known media content item to generate a match percentage score.

In an embodiment, the processing logic (e.g., metadata matching logic 230) may perform the comparison and generation of a similarity score, as described in blocks 504 and 506, for the plurality of known media content items to generate a similarity score for each of the plurality of known media content items.

At block 508, processing logic may determine that the metadata similarity between the unidentified media content item and a known media content item is above a similarity threshold. The similarity threshold may be a configured threshold determined by a test set of data to indicate whether descriptive text from metadata is similar. For example, if the similarity threshold is set at 70 out of 100, then similarity score above the threshold would indicate a likelihood of a match based upon a 70% similarity in descriptive text between the unidentified media content item and a known media content item. In an embodiment, the similarity threshold may be used to generate a subset of known media content items from the plurality of known media content items that are above the similarity threshold. The subset of known media content items may then be used to narrow the number of known media content items compared to the unidentified media content item using the normalized set of feature vectors, thereby reducing overall processing time to identify the unidentified media content item.

Referring back to FIG. 3B, at block 338, processing logic determines a second similarity between the set of features of the unidentified media content item and an additional set of features associated with a known media content item. In an embodiment, the processing logic (e.g., feature matching logic 225) may determine whether the unidentified media content item is similar to a known media content item by comparing the set of normalized feature vectors (digital fingerprint(s)) of the unidentified media content item, determined at block 332, to an additional set of normalized feature vectors (digital fingerprint(s)) for a known media content item. In an embodiment, the additional set of normalized feature vectors (digital fingerprints) for the known media content item may be pre-calculated and stored within storage 145A-145B. In another embodiment, the additional set of normalized features vectors (digital fingerprints) for a known media content item may be calculated using a similar method described by method 400 on-demand.

In an embodiment, comparing the set of normalized feature vectors (digital fingerprints) of the unidentified media content item to an additional set of normalized feature vectors (digital fingerprints) for a known media content item may include comparing sequences of beats from each of the sets of beat-synchronized feature vectors. Each of the sets of beat-synchronized chroma vectors, MFCCs, and MFCC SSMs from the unidentified media content item and the known media content item may be compared to generate three cross-similarity matrices (CSMs) for each feature type. CSMs for the MFCCs and the MFCC SSMs may be generated to include Euclidean distances between all possible pairs of feature vectors of the unidentified media content item and the known media content item.

In an embodiment, computing the CSM for the beat-synchronized chroma vectors between the unidentified media content item and a known media content item may be performed by computing the optimal transposition index (OTI), which may be used to handle a case where the unidentified media content item and a known media content item are in different keys. A mean of all chroma vectors in the unidentified media content item and a mean of all chroma vectors in the known media content item are generated. Then a correlation may be computed between the two for all possible rotations of the mean chroma of the unidentified media content item. The transposition that maximizes the correlation may then then be used to rotate all the chroma vectors in the unidentified media content item. Then the CSM for the beat-synchronized chroma vectors includes the cosine distance between all possible pairs of feature vectors of the unidentified media content item and the known media content item.

In an embodiment, SSMs may additionally be calculated for each feature type in the unidentified media content item and the known media content item. Thus resulting in three CSMs between unidentified media content item and the known media content item and six SMMs. In an embodiment, the SSMs and CSMs for the unidentified media content item and the known media content item are then fused using a Similarity Network Fusion (SNF) method. Then for each feature type, a block matrix may be constructed. In an example, within each block matrix, the upper-left block is the SSM for the unidentified media content item, the lower-right block is the SSM for the known media content item and both the upper-right block and the lower-left block is the CSM for the specific feature type, appropriately transposed. This results in three matrices.

In an embodiment, the processing logic may execute an iterative SNF process on each of the three matrices, resulting in one large fused block matrix. Within the large fused block matrix, the upper-right block is the final fused CSM comparing the unidentified media content item and the known media content item using all feature types.

Figure 7C:
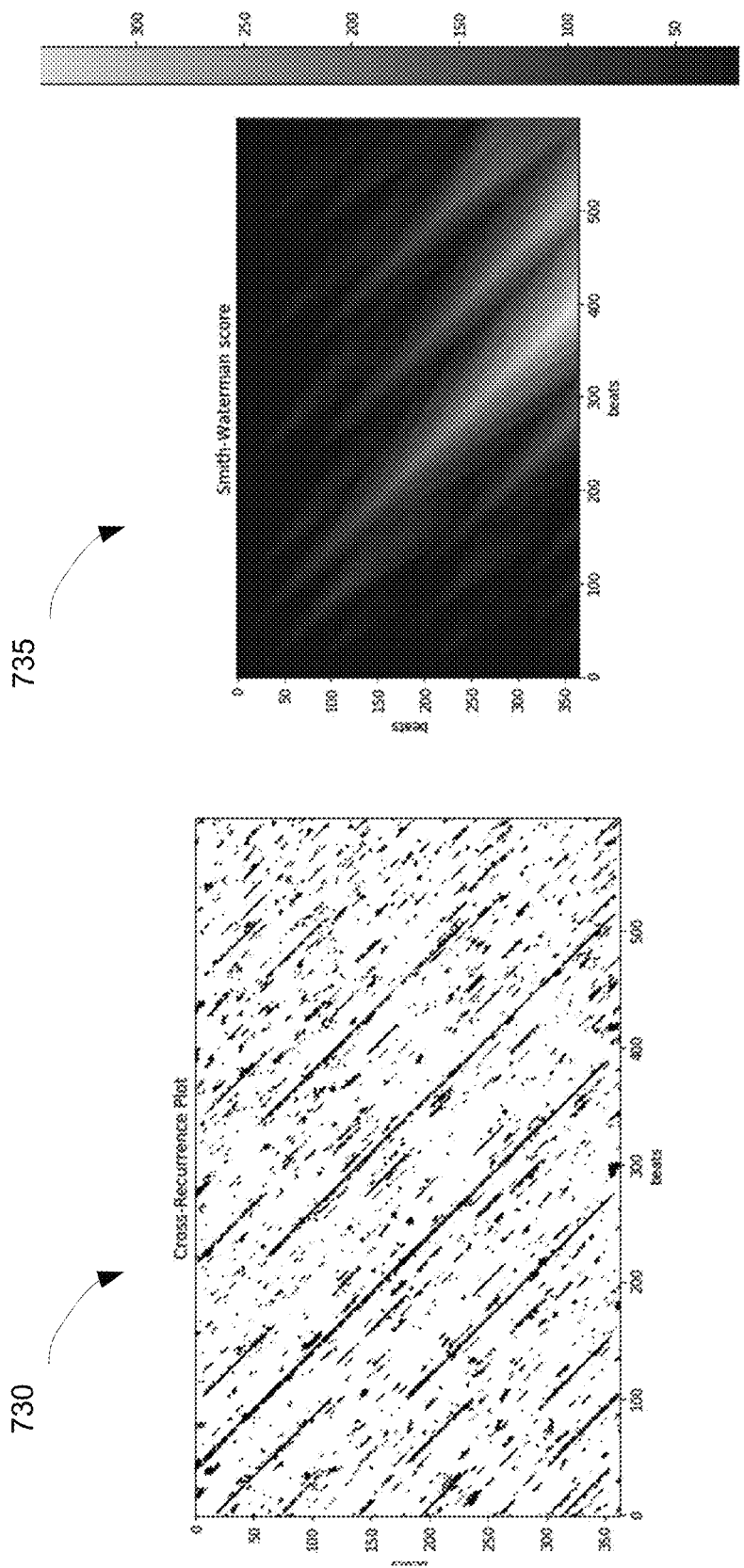
FIG. 7C illustrates an example of a cross-recurrence plot and a Smith-Waterman score for an unidentified media content item and a known media content item that are similar, according to an embodiment.
Figure 7D:
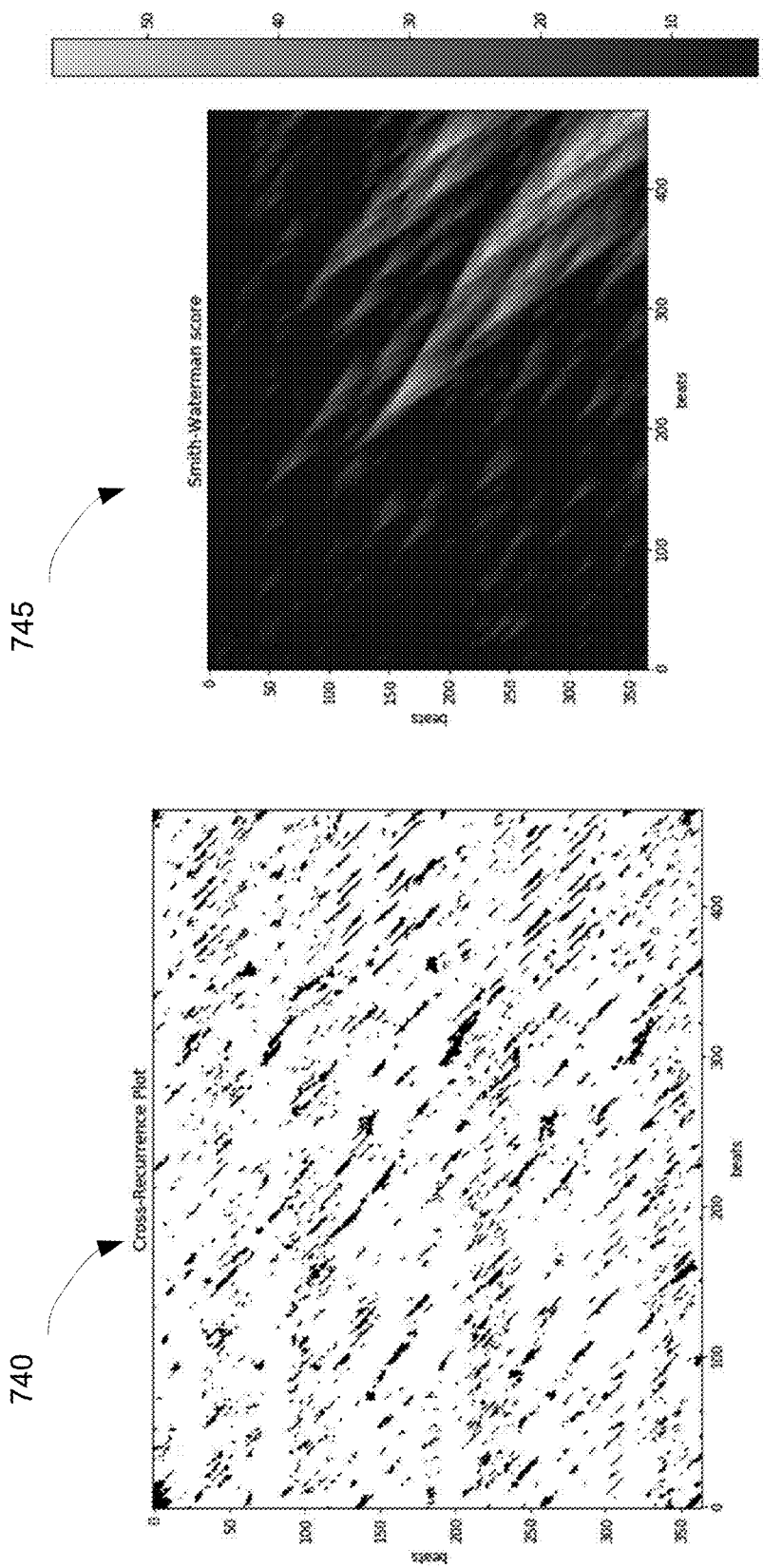
FIG. 7D illustrates an example of a cross-recurrence plot and a Smith-Waterman score for an unidentified media content item and a known media content item that are not similar, according to an embodiment.

In an embodiment, a binary cross-recurrence plot (CRP) is computed by setting those locations to one which corresponds to the closest 10% of values in each row and column of the CSM. The result may be a matrix, which a Smith-Waterman algorithm may be applied to produce a final feature similarity score. FIGS. 7C and 7D illustrates examples of CRPs and Smith-Waterman scores for a known media content item compared to a matched unidentified media content item and a not matched unidentified media content item. Graphs 730 and 740 represent the CRPs for a matched unidentified media content item and a not matched unidentified media content item, respectively. The y-axis of the graphs 730 and 740 represents beats from the known media content item and the x-axis represents beats from the unidentified media content item. Graph 730 shows matching beat locations in several places as long diagonals. The long diagonals represent matching features that are in lockstep beat-by-beat. In contrast, the no-match graph 740 does not show clear diagonals meaning that the beat-by-beat comparisons of features do not match. Graphs 735 and 745 represents the Smith-Waterman scoring results for graphs 730 and 740 respectively. The y-axis represents beats from the known media content item and the x-axis represents beats from the unidentified media content item. The lighter intensities, within graphs 735 and 745, represent higher match scores while the darker intensities represent lower match scores. Graph 735 of the matched unidentified media content item shows more consistent lighter intensities resulting in a higher overall Smith-Waterman score and a matching unidentified media content item. Conversely, graph 745 of the not matched unidentified media content item shows less consistent lighter intensities resulting in a lower overall Smith-Waterman score and a not matching unidentified media content item.

In an embodiment, a configured feature vector similarity threshold may be used to determine whether a similarity exists between the unidentified media content item and the known media content item.

Due to the complexity of determining a second similarity between the feature vectors of unidentified media content item and the known media content item, the subset of known media content items determined by the first similarity comparison may be used to narrow the set of known media content items compared to determine the second similarity. In another embodiment, the first similarity scores between the unidentified media content item and each of the known media content items may be used to sort the known media content items into a sorted list based on metadata similarity. The sorted list of known media content items may be compared for a second similarity of feature vectors in sequential order, such that when a similarity and a subsequent match is determined, the process may end resulting in an identification of a media content item as a cover of a known work. In other embodiments, identification of the unidentified media content item may be determined as a combination of determining a first and a second similarity.

Referring back to FIG. 3B, at block 340 processing logic identifies the unidentified media content item as a cover of the known media content item based on the first similarity determined (e.g., the metadata similarity score) and the second similarity determined (e.g., the feature similarity score). In an embodiment, cover identification logic 235 may use the first similarity score and the second similarity score to determine whether the unidentified media content item is a cover of the known media content item. For example, the cover identification logic 235 may first determine whether the first similarity score exceeds a configured first similarity threshold and whether the second similarity score exceeds a second similarity threshold. If both similarity thresholds are exceeded then the cover identification logic 235 identifies the unidentified media content item as a cover of the known media content item.

In an embodiment, both the first similarity score and the second similarity score may be combined to generate a combined similarity score, which is then evaluated to determine whether the unidentified media content item is a cover of the known media content item. In another embodiment, the combination of the first similarity score and the second similarity score may be combined as a non-linear weighted combination. For example, each of the similarity scores may be normalized and then multiplied together to generate a combined similarity score. In yet other embodiments, the combinations of the similarity scores may be linear, non-linear, or may use any other weight calculation algorithm.

In an embodiment, the strength of the first similarity may be used to determine the similarity threshold for the second similarity, and vice versa. If the first similarity has a very high score based on a near match in metadata, then the second similarity threshold may be lowered since the first similarity is nearly identical. For example, if the metadata of the unidentified media content item includes "Beatles, Yesterday cover", then it is highly like that the unidentified media content item is a cover of the known media content item Beatles Yesterday, even though the cover song is a metal version of Yesterday. In order to ensure that the cover may be matched, the second similarity threshold may be lowered to account for the musical differences in the two media content items.

Other embodiments for determining whether the unidentified media content item is a cover of a known media content item may include performing some of the steps described in method 330. FIG. 3D is another embodiment of a flow diagram illustrating method 380 for determining whether an unidentified media content item is a cover of a known media content item. After receiving an unidentified media content item by the communication logic 164 and determining, by method 300, that the unidentified media content item is music and is not a copy of an original work, method 300 may proceed to method 380.

At block 382, processing logic determines a set of features for the unidentified media content item. In an embodiment, a set of feature vectors are generated based upon the set of features from the unidentified media content item. As described previously, FIG. 4 depicts an embodiment for generating a set of feature vectors for the unidentified media content item.

At block 384, processing logic determines a first similarity between the set of features of the unidentified media content item and an additional set of features associated with a known media content item. In an embodiment, the feature matching logic 225 may determine whether the unidentified media content item is similar to a known media content item by comparing the set of normalized feature vectors of the unidentified media content item to an additional set of normalized features vectors for a known media content item.

At block 386, processing logic identifies the unidentified media content item as a cover of the known media content item based on the first similarity determined. In an embodiment, cover identification logic 235 may use the first similarity determined at block 384 to determine whether the unidentified media content item is a cover of the known media content item.

Upon determining that the unidentified media content item is a cover of the known media content item, at block 388 processing logic determines a publishing right holder of the known media content item. In an embodiment, licensing logic 245 may be invoked to determine a publishing rights holder of the known media content item. Publishing rights holder information may be stored along with the known media content items 147A-147B within storage 145A-145B or may be stored in another storage location. The licensing logic 245 may query the storage 145A-145B for the publishing rights holder information. Alternatively, the licensing logic 245 may query other storages or other sources, including external sources to determine the publishing holder rights information. In other embodiments, licensing logic 162, within the server computing device 150 may be invoked to determine the publishing rights holder information of the known media content item.

Upon determining the publishing rights holder information of the known media content item, a publishing resource allocation may be calculated for the identified cover-media content item. At block 390, processing logic determines a publishing resource allocation for the identified cover-media content item. In an embodiment, the licensing logic 245 may calculate, based upon publishing rights holder information which may include licensing and/or royalty fees for published cover-media content items. The publishing resource allocation may be calculated based upon the publishing rights holder information. In an embodiment, if the identified cover-media content item is a cover of two or more known media content items, then licensing logic 245 may calculate a percentage based allocation between the two or more known media content items. The percentage based allocation may be based upon the percentage of the identified cover-media content item that matches each of the two or more known media content items.

In an embodiment, licensing and/or royalty fees may differ depending on whether the cover-media content item has been upload by an amateur artist or officially released by a label and/or publisher.

Figure 3C:
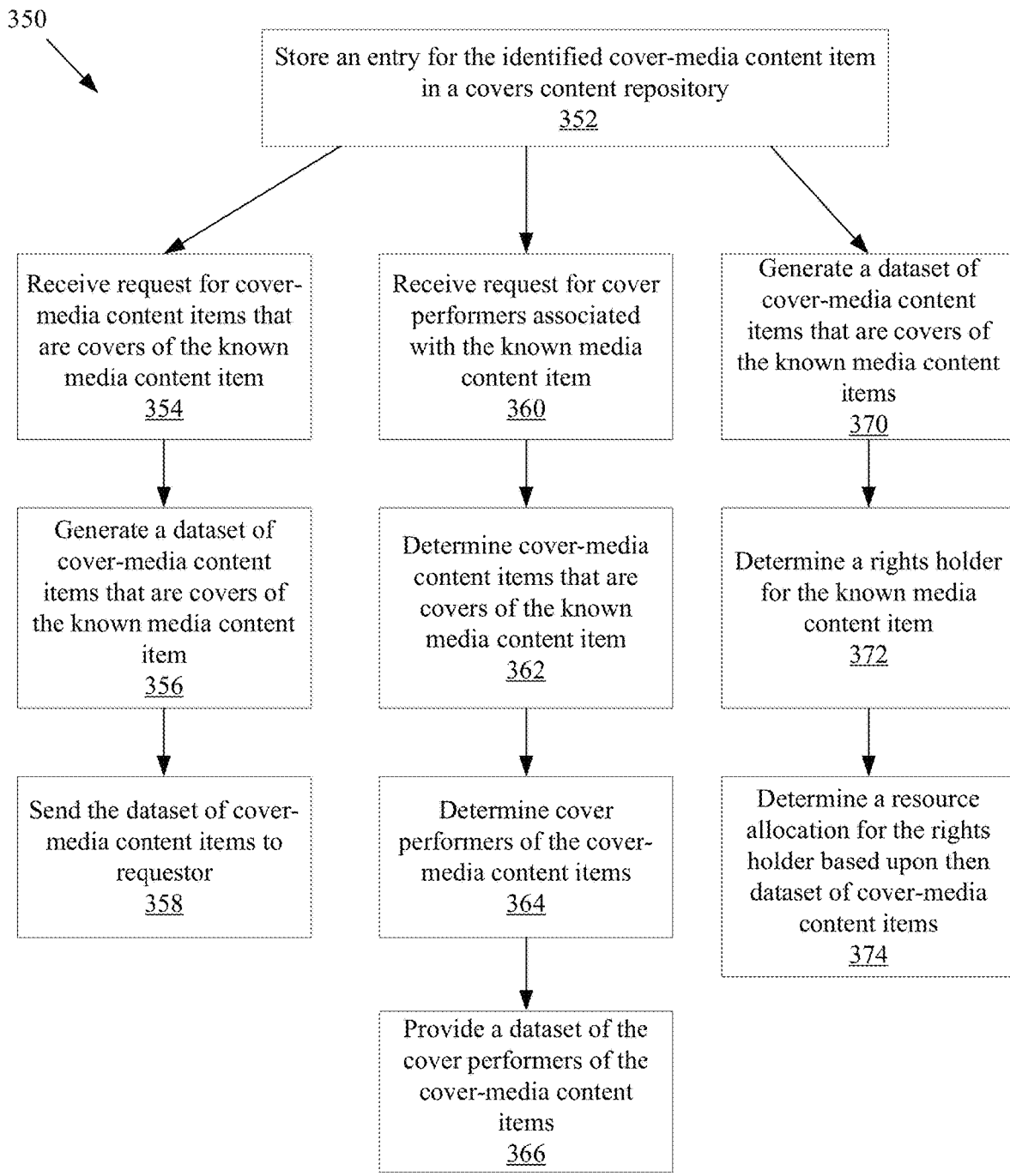
FIG. 3C is a flow diagram illustrating a method for storing the identified cover-media content item, receiving and processing multiple cover-media requests, according to an embodiment.
Figure 3D:
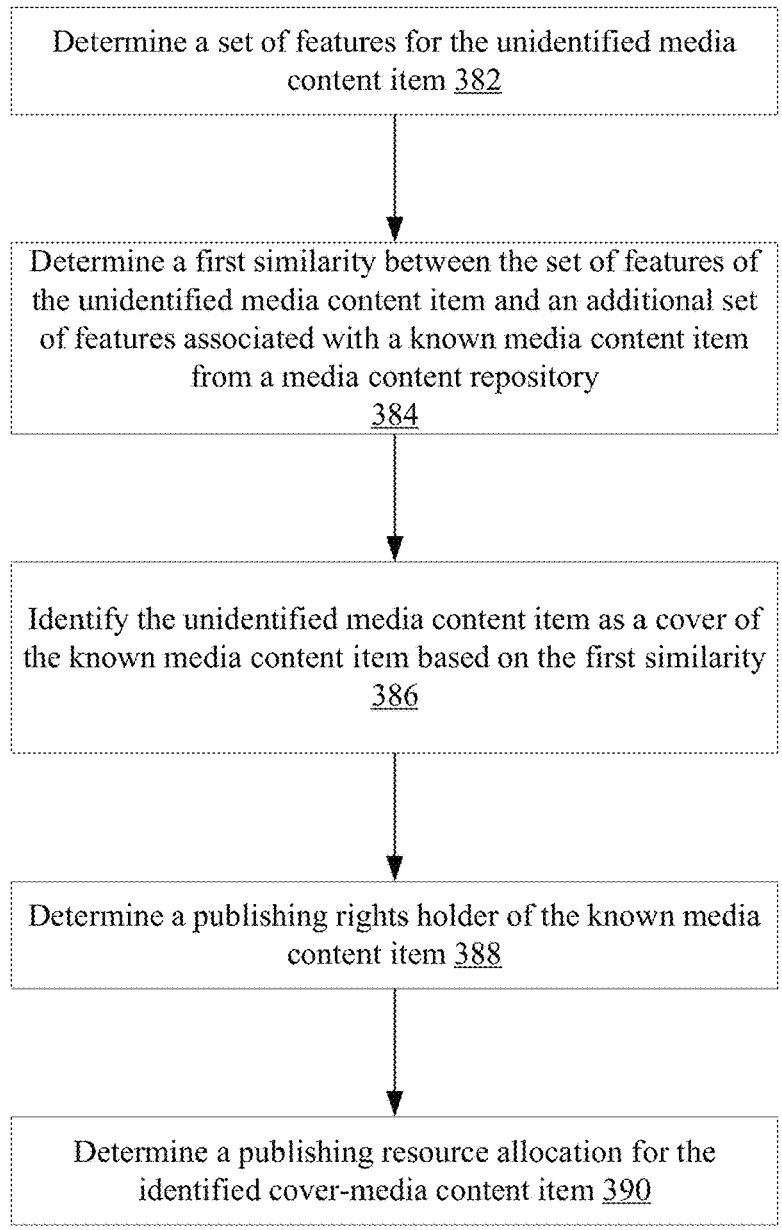
FIG. 3D is a flow diagram illustrating another method for determining an unidentified media content item as cover of a known media content item, in accordance with another embodiment.

FIG. 3C a flow diagram illustrating method 350 for storing the identified cover-media content item, receiving and processing multiple cover-media requests. At block 352, processing logic stores an entry for the identified cover-media content item in a cover content repository. In an embodiment, the media classifier 240 may store the identified cover-media content item as a cover media content item 149 within storage 145D. The stored cover-media content item 149 may include data that links the cover-media content item to the known media content item. In an embodiment, the media classifier 240 may be configured to determine, based upon training data of different musical genres, a genre to assign to the stored cover-media content item. For example, the media classifier 240 may implement machine learning models with training data to detect and identify the type of musical genre to assign to the stored cover-media content item. In other embodiment, the metadata of the stored cover-media content item may already include a genre description, which may then cause the media classifier 240 to verify the genre description using the machine learning model.

The cover-media content items 149, stored within storage 145D, may include relationships between the cover-media content items 149 and their corresponding known media content items 147A-147B. In an embodiment, an index may be used to maintain the relationships and enable search capabilities between the relationships. As such, the cover-media content items 149 may be used as a cover repository for searching and compiling sets of cover-media content items for known media content items. For example, users, media content sharing platform owners, and publishers may be able to query and compile lists of cover songs for original works such as a list of covers of the Rolling Stones' Gimmie Shelter.

At block 354, processing logic may receive a request for cover-media content items that are covers of a known media content item. In an embodiment, the cover search logic 166 may receive the request. The request may include an identifier that identifies the known media content item. In an embodiment, the request may also include filtering options such as a specified genre of cover-media content items. For example, the request may include the known media content item of The Beatles, Yesterday and filter criteria requesting all cover-media content items that are of the Hard Rock genre. The cover search logic 166 may query cover-media content items 149 for associated cover media content items that are covers of the known media content item. If the request included filter criteria for a specific genre, then the cover search logic 166 may focus the query on cover-media content items 149 of the specified genre. In another embodiment, the request may include filter criteria specifying genres the requestor wishes to exclude. In this scenario, the cover search logic 166 may focus the query on cover-media content items 149 that are of a genre other than the one(s) specified in the request.

At block 356, processing logic may generate a dataset of cover-media content items that are covers of the known media content item. The generated dataset of cover-media content items may be based on the request criteria, including filtering options. At block 358, processing logic may send the dataset of cover-media content items back to the requestor.

The cover-media content items 149 may also be queried to determine specific performers. For example, a cover artist may have uploaded, or have uploaded on his behalf, one or more cover-media content items to the media content sharing platform 175A-175B. Queries for specific performers may be beneficial for discovering new performers. Referring back to FIG. 3C, at block 360 processing logic may receive a request for cover performers associated with known media content items. Identification of cover performers would be stored within metadata of the cover-media content items 149. At block 362, processing logic may determine cover-media content items that are covers of the known media content item. In an embodiment, the cover search logic 166 may query the cover-media content items 149 for all related cover-media content items that are covers of the known media content item provided in the received request.

At block 364, processing logic may determine cover performers of the cover media content items. In an embodiment, the cover search logic 166 may extract the cover performers from metadata in the cover-media content items. At block 366, processing logic may provide a dataset of cover performers of the cover-media content items to the requestor. The dataset of cover performers may be a long list of performers depending on the known media content item and how many different cover-media content items exist. In an embodiment, the request for cover performers may also include a filter for the top cover performer. For example, the request may specify a list of the top 10 cover performers, or any other sample size. The cover search logic 166 may then select a subset of the top cover performers based upon the requested specification. For instance, if the request specified the top 10 cover performers, then the subset would include only the top ten cover performers. In an embodiment, the cover search logic 166 may be configured to determine the top cover performers based upon one or more performer metrics including the number of cover-media content items associated with a specific performer and/or a total number of views of the cover-media items associated with the specific performer. Other metrics may be temporally based, such as the cover performers from the last week or month. In other embodiments, the request to the cover search logic 166 may include the type of performer metrics to be used. At block 366, processing logic provides a dataset of the cover performers of the cover-media content items to the requestor.

Similar to resource allocation methods described in method 380, resource allocations for rights holders may be calculated for cover-media content items 149 stored on the storage 145D. At block 370, processing logic may generate a dataset of cover-media content items that are covers of a known media content item. At block 372, processing logic determines a publishing right holder of the known media content item. In an embodiment, licensing logic 162 may be invoked to determine a publishing rights holder of the known media content item. The licensing logic 245 may query the storage 145A-145B or other storages, local or remote, for the publishing rights holder information.

At block 374, processing logic determines a publishing resource allocation for the identified cover-media content item. In an embodiment, the licensing logic 245 may calculate, based upon publishing rights holder information which may include licensing and/or royalty fees for published cover-media content items.

Figure 8:
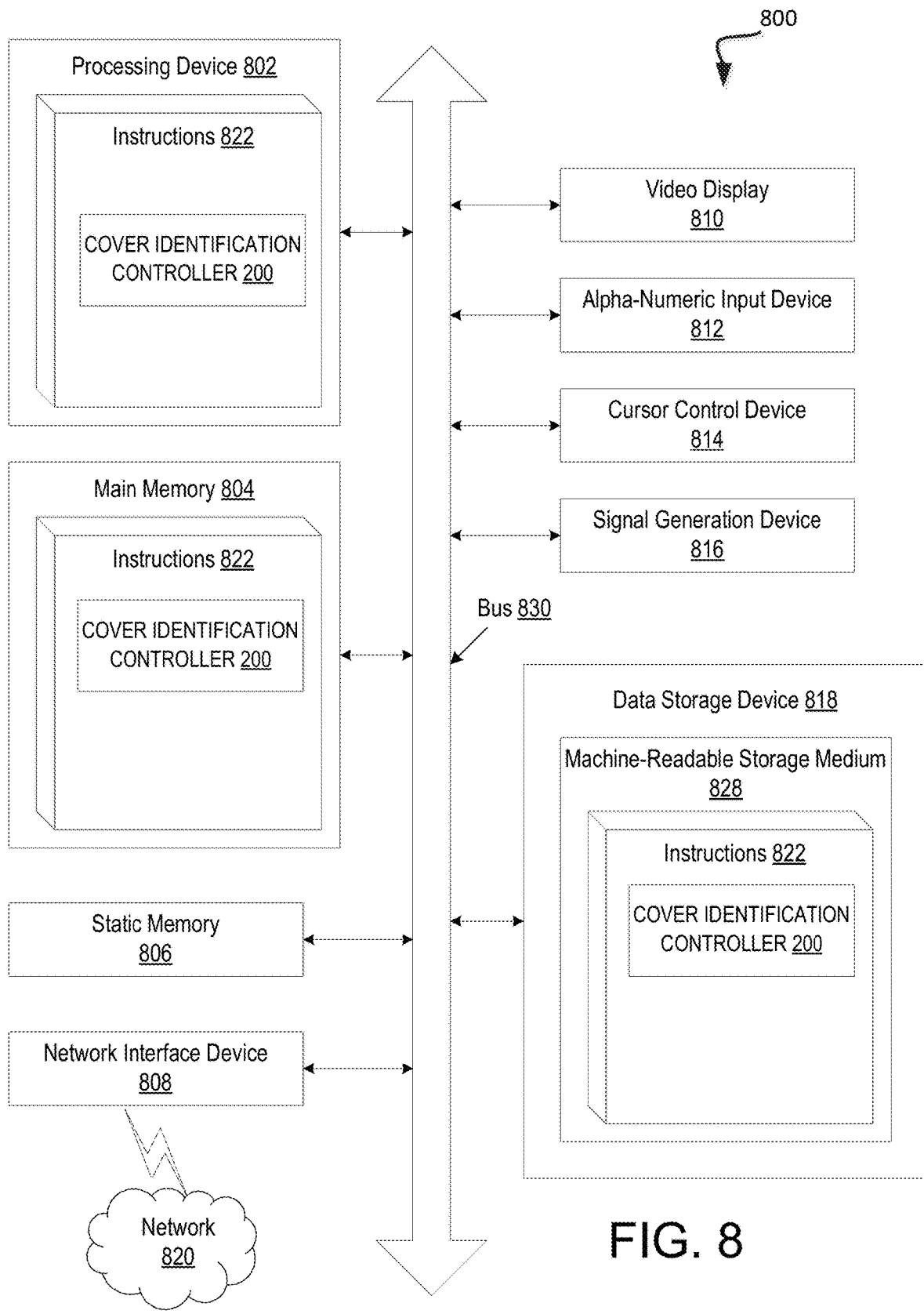
FIG. 8 is a block diagram illustrating an exemplary computer system, according to an embodiment.

FIG. 8 illustrates a diagrammatic representation of a machine in the exemplary form of a computing device 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 800 may represent computing devices 101A-B, server computing device 150 and/or client device 710, as shown in FIG. 1.

The computing device 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the cover identification controller 200 for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of cover identification controller 200) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving an unidentified media content item;
   dividing the unidentified media content item into a plurality of segments based on a beat of the unidentified media content item;
   determining, based on the dividing, a set of audio features of the unidentified media content item;
   determining metadata associated with the unidentified media content item, wherein the metadata comprises a metadata description attribute that describes the unidentified media content item, wherein the metadata is different from the set of audio features;
   normalizing the metadata of the unidentified media content item to generate a normalized descriptive text for the unidentified media content item;
   determining a match count by counting a number of words and/or trigrams that match between the normalized descriptive text of the unidentified media content item and an additional normalized descriptive text of a known media content item of a plurality of known media content items from a media content repository;
   dividing the match count by at least one of a) a number of words from the normalized descriptive text of the unidentified media content item or b) a number of words from the additional normalized descriptive text of the known media content item;
   generating, in view of the dividing the match count, a first similarity score between the normalized descriptive text of the unidentified media content item and the additional normalized descriptive text of the known media content item;
   determining, by a processing device and in view of the first similarity score, a first similarity between the metadata description attribute associated with the unidentified media content item and an additional metadata description attribute associated with the known media content item;
   determining, by the processing device, a second similarity between the set of audio features of the unidentified media content item and an additional set of audio features associated with the known media content item, wherein the second similarity is different from the first similarity; and
   identifying, by the processing device, the unidentified media content item as a cover of the known media content item based on a combination of the first similarity and the second similarity.

2. The method of claim 1, further comprising updating the metadata of the unidentified media content item to include cover information that identifies the unidentified media content item as a cover of the known media content item.

3. The method of claim 1, further comprising:
   comparing the metadata associated with the unidentified media content item with additional metadata associated with two or more of the plurality of known media content items;
   determining similarity values for each of the two or more of the plurality of known media content items based on the comparing, wherein a similarity value represents a similarity between metadata associated with a known media content item and the metadata associated with the unidentified media content item;
   determining a set of known media content items having similarity values that meet or exceed a similarity threshold; and
   comparing the set of audio features of the unidentified media content item to sets of audio features of each of the known media content items in the set of known media content items.

4. The method of claim 1, wherein determining the first similarity between the metadata description attribute associated with the unidentified media content item and the additional metadata description attribute associated with the known media content item of the plurality of known media content items comprises:
   comparing the normalized descriptive text of the unidentified media content item with the additional normalized descriptive text of the known media content item, wherein the normalized descriptive text of the known media content item is based on the additional metadata description attribute associated with the known media content item; and
   determining that the first similarity score is above a similarity threshold.

5. The method of claim 4, wherein the normalized descriptive text of the known media content item is stored within a normalized text repository of descriptions for the plurality of known media content items, wherein the normalized text repository comprises an inverted index of normalized words and trigrams generated from textual descriptions from metadata attributes associated with the plurality of known media content items.

6. The method of claim 4, wherein generating the first similarity score between the normalized descriptive text of the unidentified media content item and the normalized descriptive text of the known media content item further comprises:
   dividing the match count by a greater of a) a number of words from the normalized descriptive text of the unidentified media content item or b) a number of words from the normalized descriptive text of the known media content item.

7. The method of claim 1, wherein determining the set of audio features for the unidentified media content item comprises:
   generating a plurality of signal-based vectors from the unidentified media content item, wherein the plurality of signal-based vectors represents at least one of pitch, timbre, or rhythm;
   determining the beat of the unidentified media content item;

for each beat in the unidentified media content item, determining a plurality of normalized signal-based vectors from the plurality of signal-based vectors for a subset of the plurality of segments; and
generating the set of audio features from the normalized plurality of signal-based vectors.

8. The method of claim 1, further comprising:
responsive to identifying the unidentified media content item as the cover of the known media content item, which results in an identified cover media content item, storing an entry for the identified cover media content item in a covers content repository, the entry comprising a link between the identified cover media content item and the known media content item, wherein the covers content repository maintains relationships between cover-media content items that have been identified as cover performances of known media content items and the known media content items.

9. The method of claim 8, further comprising:
receiving a request for cover-media content items that are covers of the known media content item, wherein the request for the cover-media content items comprises an identifier identifying the known media content item;
generating a dataset of cover-media content items that are covers of the known media content item; and
sending the dataset to a requestor.

10. The method of claim 9, wherein the request for cover-media content items further comprises an indication of a specified genre; and
wherein generating the dataset of cover-media content items from the covers content repository comprises selecting a subset of the covers of the known media content item that have the specified genre.

11. The method of claim 10, wherein the specified genre is different from a genre associated with the known media content item.

12. The method of claim 8, further comprising:
receiving a request for cover performers associated with the known media content item;
determining, from the covers content repository, cover-media content items that are covers of the known media content item;
determining cover performers of the cover-media content items; and
providing a dataset comprising the cover performers of the cover-media content items.

13. The method of claim 12, wherein the request comprises a request for top cover performers of the known media content item, the method further comprising:
selecting a subset of top cover performers from the determined cover performers of the cover-media content items based on one or more performer metrics, the one or more performer metrics comprising at least one of a number of cover-media content items associated with a specific performer or a total number of views of the cover-media items associated with the specific performer.

14. The method of claim 8, further comprising:
generating a dataset of cover-media content items that are covers of the known media content item from the covers content repository;
determining a rights holder for the known media content item; and
determining a resource allocation for the rights holder based upon the dataset of cover-media content items.

15. The method of claim 1, further comprising:
determining a dynamic threshold based on the first similarity;
determining whether the second similarity exceeds the dynamic threshold; and
identifying the unidentified media content item as the cover of the known media content item responsive to determining that the second similarity exceeds the dynamic threshold.

16. A method comprising:
receiving an unidentified media content item;
dividing the unidentified media content item into a plurality of segments based on a beat of the unidentified media content item;
determining, based on the dividing, a set of audio features of the unidentified media content item;
determining, by a processing device, a first similarity between the set of audio features of the unidentified media content item and an additional set of audio features associated with a known media content item of a plurality of known media content items from a media content repository;
determining metadata associated with the unidentified media content item, wherein the metadata comprises a metadata description attribute that describes the unidentified media content item, wherein the metadata is different from the set of audio features;
determining, by the processing device, a second similarity between the metadata description attribute associated with the unidentified media content item and an additional metadata description attribute associated with the known media content item, wherein the second similarity is different from the first similarity;
determining a dynamic threshold based on the first similarity;
determining whether the second similarity exceeds the dynamic threshold;
responsive to determining that the second similarity exceeds the dynamic threshold, identifying, by the processing device, the unidentified media content item as a cover of the known media content item based on a combination of the first similarity and the second similarity, resulting in an identified cover-media content item;
determining a publishing rights holder of the known media content item; and
determining a publishing resource allocation for the identified cover-media content item.

17. The method of claim 16, further comprising updating the metadata of the unidentified media content item to include cover information that identifies the unidentified media content item as a cover of the known media content item.

18. The method of claim 16, wherein determining the set of audio features for the unidentified media content item comprises:
generating a plurality of signal-based vectors from the unidentified media content item, wherein the plurality of signal-based vectors represents at least one of pitch, timbre, or rhythm;
determining the beat of the unidentified media content item;
for each beat in the unidentified media content item, determining a plurality of normalized signal-based vectors from the plurality of signal-based vectors for a subset of the plurality of segments; and
generating the set of audio features from the normalized plurality of signal-based vectors.

19. The method of claim 16, further comprising:
responsive to identifying the unidentified media content item as the cover of the known media content item, which results in an identified cover media content item, storing an entry for the identified cover-media content item in a covers content repository, the entry comprising a link between the identified cover media content item and the known media content item, wherein the covers content repository maintains relationships between cover-media content items that have been identified as cover performances of known media content items and the known media content items.

20. A system comprising:
a memory; and
a processing device operatively coupled with the memory to:
receive an unidentified media content item;
divide the unidentified media content item into a plurality of segments based on a beat of the unidentified content item;
determine, based on the dividing, a set of audio features of the unidentified media content item;
determine metadata associated with the unidentified media content item, wherein the metadata comprises a metadata description attribute that describes the unidentified media content item, wherein the metadata is different from the set of audio features;
normalize the metadata of the unidentified media content item to generate a normalized descriptive text for the unidentified media content item;
generate a first similarity score between the normalized descriptive text of the unidentified media content item and an additional normalized descriptive text of a known media content item of a plurality of known media content items from a media content repository, wherein the additional normalized descriptive text of the known media content item is stored within a normalized text repository of descriptions for the plurality of known media content items, and wherein the normalized text repository comprises an inverted index of normalized words and trigrams generated from textual descriptions from metadata attributes associated with the plurality of known media content items;
determine, in view of the first similarity score, a first similarity between the metadata description attribute associated with the unidentified media content item and additional metadata description attribute associated with a known media content item of a plurality of known media content items from a media content repository;
determine a second similarity between the set of audio features of the unidentified media content item and an additional set of audio features associated with the known media content item, wherein the second similarity is different from the first similarity; and
identify the unidentified media content item as a cover of the known media content item based on a combination of the first similarity and the second similarity.

* * * * *